US010049330B2

(12) United States Patent
Alag et al.

(10) Patent No.: US 10,049,330 B2
(45) Date of Patent: Aug. 14, 2018

(54) PLATFORM FOR MULTI-SERVICE PROCUREMENT

(71) Applicant: DEEM, INC., San Francisco, CA (US)

(72) Inventors: Satnam Alag, Santa Clara, CA (US); Pramod Mahadev, Sunnyvale, CA (US); Anson Mah, Oakland, CA (US); Vilas Athavale, San Jose, CA (US)

(73) Assignee: Deem, Inc., San Francisco, CA (US)

( * ) Notice: Subject to any disclaimer, the term of this patent is extended or adjusted under 35 U.S.C. 154(b) by 0 days.

(21) Appl. No.: 15/332,975

(22) Filed: Oct. 24, 2016

(65) Prior Publication Data

US 2017/0103347 A1 Apr. 13, 2017

Related U.S. Application Data

(63) Continuation of application No. 11/067,537, filed on Feb. 24, 2005, now Pat. No. 9,552,599.

(Continued)

(51) Int. Cl.

| | |
|---|---|
| G06Q 30/00 | (2012.01) |
| G06Q 10/02 | (2012.01) |
| H04L 29/06 | (2006.01) |
| G06Q 10/10 | (2012.01) |
| G06Q 50/14 | (2012.01) |
| G06F 17/30 | (2006.01) |
| G06F 9/52 | (2006.01) |
| G06F 15/16 | (2006.01) |
| G06Q 40/00 | (2012.01) |

(52) U.S. Cl.
CPC .............. *G06Q 10/02* (2013.01); *G06F 9/52* (2013.01); *G06F 17/30864* (2013.01); *G06Q 10/1093* (2013.01); *G06Q 50/14* (2013.01); *H04L 65/1063* (2013.01); *H04L 67/42* (2013.01)

(58) Field of Classification Search
USPC .................................................. 705/26, 26.1
See application file for complete search history.

(56) References Cited

U.S. PATENT DOCUMENTS 4,445,181 A   4/1984 Yatman
4,626,836 A   12/1986 Curtis et al.
(Continued)

FOREIGN PATENT DOCUMENTS

| JP | 2002334115 | 11/2002 |
| JP | 2004334409 | 11/2004 |
| WO | 2003050674 | 6/2003 |

OTHER PUBLICATIONS

Platform for Multi-service Procurement, U.S. Appl. No. 11/067,537, filed Feb. 24, 2005, Satnam Alag, et al, Non Final Action dated May 17, 2016.

(Continued)

*Primary Examiner* — Ashford S Hayles
(74) *Attorney, Agent, or Firm* — Greenberg Traurig, LLP

(57) ABSTRACT

The present invention describes an on demand service provisioning system to interface with suppliers and customers. One embodiment of the present invention includes a database to store information on customers, suppliers and transactions; a module to interface customers; a module to interface suppliers; a module to interface the database; a stateful section including the module to interface with the database; and a stateless section including the module to interface with the customers and the suppliers.

15 Claims, 19 Drawing Sheets

Related U.S. Application Data

(60) Provisional application No. 60/608,725, filed on Sep. 10, 2004.

(56) References Cited

U.S. PATENT DOCUMENTS

| | | | |
|---|---|---|---|
| 4,812,843 | A | 3/1989 | Champion, III et al. |
| 4,862,357 | A | 8/1989 | Ahlstrom et al. |
| 4,977,520 | A | 12/1990 | McGaughey, III et al. |
| 5,111,391 | A | 5/1992 | Fields et al. |
| 5,237,499 | A | 8/1993 | Garback |
| 5,323,314 | A | 6/1994 | Baber et al. |
| 5,404,291 | A | 4/1995 | Kerr et al. |
| 5,422,816 | A | 6/1995 | Sprague et al. |
| 5,475,740 | A | 12/1995 | Biggs, Jr. et al. |
| 5,548,515 | A | 8/1996 | Pilley et al. |
| 5,559,707 | A | 9/1996 | DeLorme et al. |
| 5,570,283 | A | 10/1996 | Shoolery et al. |
| 5,615,121 | A | 3/1997 | Babayev et al. |
| 5,655,008 | A | 8/1997 | Futch et al. |
| 5,692,125 | A | 11/1997 | Schloss et al. |
| 5,732,277 | A | 3/1998 | Kodosky et al. |
| 5,732,401 | A | 3/1998 | Conway |
| 5,754,857 | A * | 5/1998 | Gadol ............... G06Q 10/10 709/203 |
| 5,754,953 | A | 5/1998 | Briancon et al. |
| 5,774,661 | A | 6/1998 | Chatterjee et al. |
| 5,809,250 | A | 9/1998 | Kisor |
| 5,832,451 | A | 11/1998 | Flake et al. |
| 5,832,453 | A | 11/1998 | O'Brien |
| 5,839,114 | A | 11/1998 | Lynch et al. |
| 5,850,433 | A | 12/1998 | Rondeau |
| 5,852,812 | A | 12/1998 | Reeder |
| 5,854,835 | A | 12/1998 | Montgomery et al. |
| 5,860,067 | A | 1/1999 | Onda et al. |
| 5,862,490 | A | 1/1999 | Sasuta et al. |
| 5,892,909 | A | 4/1999 | Grasso et al. |
| 5,893,077 | A | 4/1999 | Griffin |
| 5,897,620 | A | 4/1999 | Walker et al. |
| 5,901,352 | A | 5/1999 | St-Pierre et al. |
| 5,933,485 | A | 8/1999 | Chang et al. |
| 5,933,810 | A | 8/1999 | Okawa |
| 5,936,625 | A | 8/1999 | Kahl et al. |
| 5,943,652 | A | 8/1999 | Sisley et al. |
| 5,948,040 | A | 9/1999 | DeLorme et al. |
| 5,953,706 | A | 9/1999 | Patel |
| 5,960,069 | A | 9/1999 | Felger |
| 5,960,406 | A | 9/1999 | Rasansky et al. |
| 5,961,601 | A * | 10/1999 | Iyengar ............... G06F 9/54 707/E17.119 |
| 5,963,861 | A | 10/1999 | Hanson |
| 5,963,913 | A | 10/1999 | Henneuse et al. |
| 5,966,386 | A | 10/1999 | Maegawa |
| 5,974,391 | A | 10/1999 | Hongawa |
| 5,987,377 | A | 11/1999 | Westerlage et al. |
| 5,999,208 | A | 12/1999 | McNerney et al. |
| 6,011,976 | A | 1/2000 | Michaels et al. |
| 6,016,478 | A | 1/2000 | Zhang et al. |
| 6,018,715 | A | 1/2000 | Lynch et al. |
| 6,023,679 | A | 2/2000 | Acebo et al. |
| 6,023,722 | A | 2/2000 | Colyer |
| 6,035,332 | A | 3/2000 | Ingrassia, Jr. et al. |
| 6,038,542 | A | 3/2000 | Ruckdashel |
| 6,041,305 | A | 3/2000 | Sakurai |
| 6,044,257 | A | 3/2000 | Boling et al. |
| 6,047,327 | A | 4/2000 | Tso et al. |
| 6,052,563 | A | 4/2000 | Macko |
| 6,058,179 | A | 5/2000 | Shaffer et al. |
| 6,076,108 | A | 6/2000 | Courts et al. |
| 6,078,907 | A | 6/2000 | Lamm |
| 6,085,166 | A * | 7/2000 | Beckhardt ............ G06Q 10/109 705/7.18 |
| 6,101,480 | A | 8/2000 | Conmy et al. |
| 6,115,646 | A * | 9/2000 | Fiszman ............... G06Q 10/10 700/104 |
| 6,119,094 | A | 9/2000 | Lynch et al. |
| 6,134,534 | A | 10/2000 | Walker et al. |
| 6,144,942 | A | 11/2000 | Ruckdashel |
| 6,148,261 | A | 11/2000 | Obradovich et al. |
| 6,166,728 | A | 12/2000 | Haman et al. |
| 6,167,379 | A | 12/2000 | Dean et al. |
| 6,169,955 | B1 | 1/2001 | Fultz |
| 6,173,279 | B1 | 1/2001 | Levin et al. |
| 6,177,905 | B1 | 1/2001 | Welch |
| 6,189,003 | B1 | 2/2001 | Leal |
| 6,195,420 | B1 | 2/2001 | Tognazzini |
| 6,202,062 | B1 | 3/2001 | Cameron et al. |
| 6,216,227 | B1 | 4/2001 | Goldstein et al. |
| 6,220,512 | B1 | 4/2001 | Cooper |
| 6,230,204 | B1 | 5/2001 | Fleming, III |
| 6,240,396 | B1 | 5/2001 | Walker et al. |
| 6,253,369 | B1 | 6/2001 | Cloud et al. |
| 6,286,046 | B1 | 9/2001 | Bryant |
| 6,292,783 | B1 | 9/2001 | Rohler et al. |
| 6,295,521 | B1 | 9/2001 | DeMarcken et al. |
| 6,298,352 | B1 | 10/2001 | Kannan et al. |
| 6,301,533 | B1 | 10/2001 | Markow |
| 6,304,850 | B1 | 10/2001 | Keller et al. |
| 6,307,572 | B1 | 10/2001 | DeMarcken et al. |
| 6,313,852 | B1 | 11/2001 | Ishizaki et al. |
| 6,321,158 | B1 | 11/2001 | DeLorme et al. |
| 6,324,517 | B1 | 11/2001 | Bingham et al. |
| 6,327,359 | B1 | 12/2001 | Kang et al. |
| 6,334,109 | B1 | 12/2001 | Kanevsky et al. |
| 6,349,238 | B1 | 2/2002 | Gabbita et al. |
| 6,360,205 | B1 | 3/2002 | Iyengar et al. |
| 6,378,771 | B1 | 4/2002 | Cooper |
| 6,380,956 | B1 | 4/2002 | Yee et al. |
| 6,385,620 | B1 * | 5/2002 | Kurzius ............... G06Q 10/10 |
| 6,396,920 | B1 | 5/2002 | Cox et al. |
| 6,397,191 | B1 | 5/2002 | Notani et al. |
| 6,414,635 | B1 | 7/2002 | Stewart et al. |
| 6,418,471 | B1 | 7/2002 | Shelton et al. |
| 6,421,705 | B1 | 7/2002 | Northrup |
| 6,441,836 | B1 | 8/2002 | Takasu et al. |
| 6,442,526 | B1 * | 8/2002 | Vance ............... G06Q 10/02 705/30 |
| 6,456,207 | B1 | 9/2002 | Yen |
| 6,456,709 | B1 | 9/2002 | Cox et al. |
| 6,457,045 | B1 | 9/2002 | Hanson et al. |
| 6,457,132 | B1 | 9/2002 | Borgendale et al. |
| 6,466,161 | B2 | 10/2002 | Turetzky et al. |
| 6,477,503 | B1 | 11/2002 | Mankes |
| 6,477,520 | B1 | 11/2002 | Malaviya et al. |
| 6,501,421 | B1 | 12/2002 | Dutta et al. |
| 6,505,176 | B2 * | 1/2003 | DeFrancesco, Jr. ... G06Q 10/10 705/38 |
| 6,506,056 | B1 | 1/2003 | DeMedio |
| 6,519,571 | B1 | 2/2003 | Guheen et al. |
| 6,529,597 | B1 | 3/2003 | Barrett |
| 6,553,346 | B1 | 4/2003 | Walker et al. |
| 6,570,580 | B1 | 5/2003 | Suzuki et al. |
| 6,571,213 | B1 | 5/2003 | Altendahl et al. |
| 6,574,329 | B2 | 6/2003 | Takeuchi et al. |
| 6,587,827 | B1 | 7/2003 | Hennig et al. |
| 6,603,489 | B1 | 8/2003 | Edlund et al. |
| 6,618,668 | B1 | 9/2003 | Laird |
| 6,631,363 | B1 | 10/2003 | Brown et al. |
| 6,640,230 | B1 | 10/2003 | Alexander et al. |
| 6,643,622 | B2 | 11/2003 | Stuart et al. |
| 6,643,639 | B2 | 11/2003 | Biebesheimer et al. |
| 6,650,902 | B1 | 11/2003 | Richton |
| 6,658,093 | B1 | 12/2003 | Langseth et al. |
| 6,662,016 | B1 | 12/2003 | Buckham et al. |
| 6,674,449 | B1 | 1/2004 | Banks et al. |
| 6,675,151 | B1 | 1/2004 | Thompson et al. |
| 6,687,678 | B1 | 2/2004 | Yorimatsu et al. |
| 6,691,029 | B2 | 2/2004 | Hughes et al. |
| 6,691,153 | B1 | 2/2004 | Hanson et al. |
| 6,700,535 | B2 | 3/2004 | Gilkes et al. |
| 6,701,311 | B2 | 3/2004 | Biebesheimer et al. |
| 6,732,080 | B1 | 5/2004 | Blants |
| 6,732,103 | B1 | 5/2004 | Stick et al. |
| 6,741,969 | B1 | 5/2004 | Chen et al. |

(56) References Cited

U.S. PATENT DOCUMENTS

| | | |
|---|---|---|
| 6,757,689 B2 | 6/2004 | Battas et al. |
| 6,766,363 B1 | 7/2004 | Rothschild |
| 6,769,009 B1 | 7/2004 | Reisman |
| 6,775,371 B2 | 8/2004 | Elsey et al. |
| 6,781,920 B2 | 8/2004 | Bates et al. |
| 6,788,946 B2 | 9/2004 | Winchell et al. |
| 6,801,226 B1 | 10/2004 | Daughtrey |
| 6,802,005 B1 | 10/2004 | Berson |
| 6,816,882 B1 | 11/2004 | Conner et al. |
| 6,817,008 B2 * | 11/2004 | Ledford ............... G06Q 10/10 715/234 |
| 6,826,473 B1 | 11/2004 | Burch et al. |
| 6,842,737 B1 | 1/2005 | Stiles et al. |
| 6,845,370 B2 | 1/2005 | Burkey et al. |
| 6,847,988 B2 | 1/2005 | Toyouchi et al. |
| 6,857,017 B1 | 2/2005 | Faour et al. |
| 6,889,205 B1 | 5/2005 | Lamm |
| 6,901,438 B1 | 5/2005 | Davis et al. |
| 6,907,119 B2 | 6/2005 | Case et al. |
| 6,909,903 B2 | 6/2005 | Wang |
| 6,934,684 B2 | 8/2005 | Alpdemir et al. |
| 6,937,991 B1 | 8/2005 | Zompa et al. |
| 6,944,273 B2 | 9/2005 | Huna |
| 6,944,479 B2 | 9/2005 | Andaker et al. |
| 6,958,692 B1 | 10/2005 | Ratschunas |
| 6,961,773 B2 | 11/2005 | Hartman et al. |
| 6,970,871 B1 | 11/2005 | Rayburn |
| 6,985,939 B2 | 1/2006 | Fletcher et al. |
| 6,993,430 B1 | 1/2006 | Bellesfield et al. |
| 6,993,503 B1 | 1/2006 | Heissenbuttel et al. |
| 6,993,554 B2 | 1/2006 | O'Donnell |
| 7,007,080 B2 | 2/2006 | Wilson |
| 7,013,127 B2 | 3/2006 | Wills et al. |
| 7,024,205 B1 | 4/2006 | Hose |
| 7,027,995 B2 | 4/2006 | Kaufman et al. |
| 7,031,945 B2 | 4/2006 | Donner |
| 7,050,986 B1 | 5/2006 | Vance et al. |
| 7,054,825 B1 | 5/2006 | Hirahara et al. |
| 7,054,939 B2 | 5/2006 | Koch et al. |
| 7,062,771 B2 * | 6/2006 | Wall ..................... G06F 8/10 707/999.103 |
| 7,072,666 B1 | 7/2006 | Kullman et al. |
| 7,076,431 B2 | 7/2006 | Kurganov et al. |
| 7,076,451 B1 | 7/2006 | Coupland et al. |
| 7,080,019 B1 | 7/2006 | Hurzeler |
| 7,080,092 B2 * | 7/2006 | Upton ................... G06F 9/541 |
| 7,092,892 B1 | 8/2006 | Sobalvarro et al. |
| 7,099,236 B2 | 8/2006 | Yamagishi |
| 7,099,855 B1 | 8/2006 | Nelken et al. |
| 7,103,572 B2 | 9/2006 | Kawaguchi et al. |
| 7,123,141 B2 | 10/2006 | Contestabile |
| 7,124,089 B2 | 10/2006 | Cornwell |
| 7,130,885 B2 | 10/2006 | Chandra et al. |
| 7,136,821 B1 | 11/2006 | Kohavi et al. |
| 7,139,718 B2 | 11/2006 | Jeyachandran et al. |
| 7,139,728 B2 | 11/2006 | Rigole |
| 7,139,978 B2 | 11/2006 | Rojewski et al. |
| 7,149,700 B1 | 12/2006 | Munoz et al. |
| 7,152,038 B2 | 12/2006 | Murashita et al. |
| 7,154,621 B2 | 12/2006 | Rodriguez et al. |
| 7,161,497 B2 | 1/2007 | Gueziec |
| 7,171,369 B1 | 1/2007 | Bertram et al. |
| 7,188,073 B1 | 3/2007 | Tam et al. |
| 7,207,009 B1 | 4/2007 | Aamodt et al. |
| 7,212,983 B2 | 5/2007 | Redmann et al. |
| 7,213,048 B1 | 5/2007 | Parupudi et al. |
| 7,222,084 B2 | 5/2007 | Archibald et al. |
| 7,222,334 B2 | 5/2007 | Casati et al. |
| 7,233,955 B2 | 6/2007 | Machida et al. |
| 7,233,971 B1 | 6/2007 | Levy |
| 7,236,942 B1 | 6/2007 | Walker et al. |
| 7,236,976 B2 | 6/2007 | Breitenbach et al. |
| RE39,717 E | 7/2007 | Yates et al. |
| 7,263,494 B1 | 8/2007 | Harris |
| 7,263,664 B1 | 8/2007 | Daughtrey |
| 7,277,888 B2 | 10/2007 | Gelormine et al. |
| 7,283,970 B2 | 10/2007 | Cragun et al. |
| 7,287,093 B2 | 10/2007 | Lynch et al. |
| 7,299,286 B2 | 11/2007 | Ramsayer et al. |
| 7,300,346 B2 | 11/2007 | Lydon et al. |
| 7,305,356 B2 | 12/2007 | Rodon |
| 7,305,454 B2 | 12/2007 | Reese et al. |
| 7,328,406 B2 | 2/2008 | Kalinoski et al. |
| 7,337,125 B2 | 2/2008 | Kraft et al. |
| 7,340,048 B2 | 3/2008 | Stern et al. |
| 7,340,402 B1 | 3/2008 | DeMarcken |
| 7,340,679 B2 | 3/2008 | Botscheck et al. |
| 7,343,165 B2 | 3/2008 | Obradovich |
| 7,343,312 B2 | 3/2008 | Capek et al. |
| 7,343,338 B2 | 3/2008 | Etkin |
| 7,360,164 B2 | 4/2008 | Bjoernsen et al. |
| 7,367,491 B2 | 5/2008 | Cheng et al. |
| 7,382,773 B2 * | 6/2008 | Schoeneberger ... H04L 41/5064 370/353 |
| 7,383,225 B2 | 6/2008 | Hallihan |
| 7,383,291 B2 | 6/2008 | Guiheneuf et al. |
| 7,389,351 B2 | 6/2008 | Horvitz |
| 7,409,643 B2 | 8/2008 | Daughtrey |
| 7,418,409 B1 | 8/2008 | Goel |
| 7,426,537 B2 | 9/2008 | Lee et al. |
| 7,430,724 B2 | 9/2008 | Othmer |
| 7,451,392 B1 | 11/2008 | Chalecki et al. |
| 7,471,209 B2 | 12/2008 | Hart |
| 7,487,211 B2 | 2/2009 | Beavers et al. |
| 7,499,864 B2 * | 3/2009 | Campbell ............... G06Q 10/02 705/5 |
| 7,506,805 B1 | 3/2009 | Chakravarthy |
| 7,512,451 B2 * | 3/2009 | Detzler ................. G06Q 10/10 700/29 |
| 7,580,862 B1 * | 8/2009 | Montelo ................ G06Q 10/10 705/26.1 |
| 7,599,858 B1 | 10/2009 | Grady et al. |
| 7,603,285 B2 | 10/2009 | Jacobs et al. |
| 7,640,548 B1 | 12/2009 | Yu et al. |
| 7,668,536 B2 | 2/2010 | Hull et al. |
| 7,681,786 B1 | 3/2010 | Chakravarthy |
| 7,698,316 B2 | 4/2010 | Song et al. |
| 7,698,398 B1 * | 4/2010 | Lai ............ G06F 8/10 709/223 |
| 7,706,808 B1 | 4/2010 | Aggarwal et al. |
| 7,729,922 B2 * | 6/2010 | Chen ..................... G06Q 10/06 705/1.1 |
| 7,742,954 B1 | 6/2010 | Handel et al. |
| 7,806,328 B2 | 10/2010 | Chakravarthy |
| 7,809,592 B2 * | 10/2010 | Fitzgerald ............. G06Q 10/02 705/5 |
| 7,925,540 B1 | 4/2011 | Orttung et al. |
| 7,970,666 B1 | 6/2011 | Handel |
| 8,090,707 B1 | 1/2012 | Orttung et al. |
| 8,117,073 B1 | 2/2012 | Orttung et al. |
| 8,121,953 B1 | 2/2012 | Orttung et al. |
| 8,180,796 B1 | 5/2012 | Mah et al. |
| 8,561,069 B2 * | 10/2013 | Masuoka ................ G06F 9/451 718/100 |
| 9,552,599 B1 | 1/2017 | Alag et al. |
| 2001/0005848 A1 * | 6/2001 | Haverstock ........... G06F 17/211 |
| 2001/0014866 A1 | 8/2001 | Conmy et al. |
| 2001/0014867 A1 | 8/2001 | Conmy |
| 2001/0018661 A1 | 8/2001 | Sato et al. |
| 2001/0021913 A1 * | 9/2001 | Leymann ............... G06Q 10/10 718/103 |
| 2001/0042032 A1 | 11/2001 | Crawshaw et al. |
| 2001/0044748 A1 | 11/2001 | Maier |
| 2001/0047316 A1 | 11/2001 | Hallihan |
| 2001/0047326 A1 * | 11/2001 | Broadbent ............ G06Q 10/10 705/38 |
| 2001/0049619 A1 | 12/2001 | Powell et al. |
| 2001/0049637 A1 | 12/2001 | Tso |
| 2001/0051876 A1 | 12/2001 | Seigel et al. |
| 2001/0054101 A1 | 12/2001 | Wilson |
| 2001/0056354 A1 | 12/2001 | Feit et al. |
| 2002/0000930 A1 | 1/2002 | Crowson et al. |
| 2002/0007300 A1 | 1/2002 | Slatter |

(56) References Cited

U.S. PATENT DOCUMENTS

| | | |
|---|---|---|
| 2002/0007327 A1 | 1/2002 | Steury et al. |
| 2002/0010664 A1 | 1/2002 | Rabideau et al. |
| 2002/0013729 A1 | 1/2002 | Kida |
| 2002/0016723 A1 | 2/2002 | Matsui et al. |
| 2002/0016729 A1* | 2/2002 | Breitenbach ............ G06Q 10/06 707/802 |
| 2002/0022923 A1 | 2/2002 | Hirabayashi et al. |
| 2002/0022981 A1 | 2/2002 | Goldstein |
| 2002/0023132 A1 | 2/2002 | Tornabene et al. |
| 2002/0023230 A1 | 2/2002 | Bolnick et al. |
| 2002/0026336 A1 | 2/2002 | Eizenburg et al. |
| 2002/0029178 A1 | 3/2002 | Wiederin et al. |
| 2002/0032589 A1 | 3/2002 | Shah |
| 2002/0032592 A1 | 3/2002 | Krasnick et al. |
| 2002/0032597 A1 | 3/2002 | Chanos |
| 2002/0035474 A1 | 3/2002 | Alpdemir |
| 2002/0038180 A1 | 3/2002 | Bellesfield et al. |
| 2002/0046076 A1 | 4/2002 | Baillargeon et al. |
| 2002/0046301 A1 | 4/2002 | Shannon et al. |
| 2002/0049644 A1 | 4/2002 | Kargman |
| 2002/0055906 A1 | 5/2002 | Katz et al. |
| 2002/0057212 A1 | 5/2002 | Hamilton et al. |
| 2002/0065689 A1 | 5/2002 | Bingham et al. |
| 2002/0067308 A1 | 6/2002 | Robertson |
| 2002/0069093 A1 | 6/2002 | Stanfield |
| 2002/0069094 A1 | 6/2002 | Bingham et al. |
| 2002/0073088 A1 | 6/2002 | Beckmann et al. |
| 2002/0077871 A1 | 6/2002 | Udelhoven et al. |
| 2002/0082978 A1 | 6/2002 | Ghouri et al. |
| 2002/0087367 A1 | 7/2002 | Azani |
| 2002/0087384 A1 | 7/2002 | Neifeld |
| 2002/0087706 A1 | 7/2002 | Ogawa |
| 2002/0091556 A1 | 7/2002 | Fiala et al. |
| 2002/0099613 A1 | 7/2002 | Swart et al. |
| 2002/0103746 A1 | 8/2002 | Moffett, Jr. |
| 2002/0107027 A1 | 8/2002 | O'Neil |
| 2002/0111845 A1 | 8/2002 | Chong |
| 2002/0111848 A1 | 8/2002 | White |
| 2002/0116235 A1 | 8/2002 | Grimm et al. |
| 2002/0118118 A1 | 8/2002 | Myllymaki et al. |
| 2002/0120519 A1 | 8/2002 | Martin et al. |
| 2002/0120548 A1 | 8/2002 | Etkin |
| 2002/0128903 A1 | 9/2002 | Kernahan |
| 2002/0131565 A1 | 9/2002 | Scheuring et al. |
| 2002/0143819 A1 | 10/2002 | Han et al. |
| 2002/0147611 A1* | 10/2002 | Greene .......... G06Q 10/063112 705/1.1 |
| 2002/0151321 A1 | 10/2002 | Winchell et al. |
| 2002/0152100 A1* | 10/2002 | Chen ...................... G06Q 10/02 705/5 |
| 2002/0152101 A1 | 10/2002 | Lawson et al. |
| 2002/0152190 A1 | 10/2002 | Biebesheimer et al. |
| 2002/0154178 A1 | 10/2002 | Barnett et al. |
| 2002/0156659 A1 | 10/2002 | Walker et al. |
| 2002/0156661 A1 | 10/2002 | Jones et al. |
| 2002/0156731 A1 | 10/2002 | Seki et al. |
| 2002/0156839 A1 | 10/2002 | Peterson et al. |
| 2002/0160745 A1 | 10/2002 | Wang |
| 2002/0161611 A1 | 10/2002 | Price et al. |
| 2002/0161862 A1 | 10/2002 | Horvitz |
| 2002/0165732 A1 | 11/2002 | Ezzeddine et al. |
| 2002/0165903 A1 | 11/2002 | Zargham et al. |
| 2002/0184063 A1 | 12/2002 | Kaufman et al. |
| 2002/0184302 A1 | 12/2002 | Prueitt et al. |
| 2002/0188513 A1* | 12/2002 | Gil ........................ G06Q 10/08 705/22 |
| 2002/0188607 A1* | 12/2002 | Kogut-O'Connell G06Q 10/109 |
| 2002/0188610 A1* | 12/2002 | Spencer, Jr. ....... G06F 17/30893 |
| 2002/0194037 A1 | 12/2002 | Creed et al. |
| 2002/0194262 A1 | 12/2002 | Jorgenson |
| 2003/0004746 A1 | 1/2003 | Kheirolomoom et al. |
| 2003/0004762 A1 | 1/2003 | Banerjee et al. |
| 2003/0005181 A1* | 1/2003 | Bau, III .................... G06F 8/34 719/330 |
| 2003/0009545 A1* | 1/2003 | Sahai .................... G06Q 10/10 709/223 |
| 2003/0013438 A1 | 1/2003 | Darby |
| 2003/0018499 A1 | 1/2003 | Miller et al. |
| 2003/0018551 A1 | 1/2003 | Hanson et al. |
| 2003/0018702 A1* | 1/2003 | Broughton ............ H04M 3/523 709/202 |
| 2003/0018808 A1 | 1/2003 | Brouk et al. |
| 2003/0023463 A1 | 1/2003 | Dombroski et al. |
| 2003/0033164 A1 | 2/2003 | Faltings et al. |
| 2003/0033179 A1* | 2/2003 | Katz .................... G06Q 10/063 705/7.12 |
| 2003/0036917 A1 | 2/2003 | Hite et al. |
| 2003/0036929 A1 | 2/2003 | Vaughan et al. |
| 2003/0036941 A1 | 2/2003 | Leska et al. |
| 2003/0037263 A1* | 2/2003 | Kamat .................. G06F 21/604 726/14 |
| 2003/0040945 A1 | 2/2003 | Fujita et al. |
| 2003/0040946 A1 | 2/2003 | Sprenger et al. |
| 2003/0041178 A1 | 2/2003 | Brouk et al. |
| 2003/0046639 A1* | 3/2003 | Fai ........................ G06Q 10/10 |
| 2003/0050806 A1 | 3/2003 | Friesen et al. |
| 2003/0053459 A1 | 3/2003 | Brouk et al. |
| 2003/0053611 A1 | 3/2003 | Lee |
| 2003/0055668 A1* | 3/2003 | Saran .................... G06F 9/465 705/301 |
| 2003/0055689 A1 | 3/2003 | Block et al. |
| 2003/0061145 A1 | 3/2003 | Norrid |
| 2003/0065556 A1 | 4/2003 | Takanashi et al. |
| 2003/0065805 A1 | 4/2003 | Barnes, Jr. |
| 2003/0069899 A1 | 4/2003 | Brown et al. |
| 2003/0087648 A1 | 5/2003 | Mezhvinsky et al. |
| 2003/0093403 A1* | 5/2003 | Upton .................... G06F 9/541 |
| 2003/0093500 A1* | 5/2003 | Khodabakchian .... G06F 9/5038 709/219 |
| 2003/0093575 A1* | 5/2003 | Upton .................... G06F 9/541 719/310 |
| 2003/0100315 A1 | 5/2003 | Rankin |
| 2003/0110062 A1 | 6/2003 | Mogler et al. |
| 2003/0110063 A1 | 6/2003 | Among et al. |
| 2003/0110070 A1* | 6/2003 | De Goeij ....... G06Q 10/063114 705/7.15 |
| 2003/0110091 A1 | 6/2003 | Inaba et al. |
| 2003/0120593 A1* | 6/2003 | Bansal .............. G06F 17/30873 705/39 |
| 2003/0126136 A1* | 7/2003 | Omoigui ............. G06F 17/3089 |
| 2003/0126250 A1 | 7/2003 | Jhanji |
| 2003/0142122 A1 | 7/2003 | Straut et al. |
| 2003/0149606 A1 | 8/2003 | Cragun et al. |
| 2003/0149641 A1 | 8/2003 | Kouketsu et al. |
| 2003/0154116 A1 | 8/2003 | Lofton |
| 2003/0158493 A1 | 8/2003 | Goor et al. |
| 2003/0158776 A1 | 8/2003 | Landesmann |
| 2003/0158784 A1 | 8/2003 | Shaver et al. |
| 2003/0158847 A1 | 8/2003 | Wissner et al. |
| 2003/0163251 A1 | 8/2003 | Obradovich et al. |
| 2003/0164850 A1 | 9/2003 | Rojewski et al. |
| 2003/0165223 A1 | 9/2003 | Timmins et al. |
| 2003/0171944 A1 | 9/2003 | Fine et al. |
| 2003/0172020 A1 | 9/2003 | Davies et al. |
| 2003/0177045 A1* | 9/2003 | Fitzgerald ............ G06Q 10/02 705/6 |
| 2003/0182413 A1 | 9/2003 | Allen et al. |
| 2003/0187743 A1* | 10/2003 | Kumaran ........... G06Q 10/0637 705/26.1 |
| 2003/0195811 A1 | 10/2003 | Hayes, Jr. et al. |
| 2003/0204474 A1 | 10/2003 | Capek et al. |
| 2003/0204622 A1 | 10/2003 | Blizniak et al. |
| 2003/0208583 A1* | 11/2003 | Schroeder ............ G06F 9/465 709/223 |
| 2003/0212486 A1 | 11/2003 | Hughes et al. |
| 2003/0217044 A1 | 11/2003 | Zhang et al. |
| 2003/0217073 A1 | 11/2003 | Walther et al. |
| 2003/0229900 A1 | 12/2003 | Reisman |
| 2003/0233278 A1 | 12/2003 | Marshall |
| 2004/0003040 A1 | 1/2004 | Beavers et al. |

(56) References Cited

U.S. PATENT DOCUMENTS

| | | |
|---|---|---|
| 2004/0003042 A1 | 1/2004 | Horvitz et al. |
| 2004/0003402 A1 | 1/2004 | McKenna, Jr. |
| 2004/0014457 A1 | 1/2004 | Stevens |
| 2004/0015366 A1* | 1/2004 | Wiseman .......... G06F 17/30569 705/1.1 |
| 2004/0015380 A1 | 1/2004 | Timmins |
| 2004/0015821 A1* | 1/2004 | Lu ........................ G06F 9/541 717/103 |
| 2004/0027379 A1 | 2/2004 | Hong Huey et al. |
| 2004/0030568 A1 | 2/2004 | Kocznar et al. |
| 2004/0039613 A1 | 2/2004 | Maycotte et al. |
| 2004/0039617 A1 | 2/2004 | Maycotte et al. |
| 2004/0044556 A1 | 3/2004 | Brady et al. |
| 2004/0045004 A1 | 3/2004 | Cheenath |
| 2004/0054569 A1 | 3/2004 | Pombo et al. |
| 2004/0054574 A1 | 3/2004 | Kaufman et al. |
| 2004/0064503 A1 | 4/2004 | Karakashian et al. |
| 2004/0068247 A1 | 4/2004 | Connor |
| 2004/0068568 A1* | 4/2004 | Griffin .................. G06F 3/0481 709/227 |
| 2004/0073615 A1 | 4/2004 | Darling |
| 2004/0076280 A1 | 4/2004 | Ando et al. |
| 2004/0078247 A1 | 4/2004 | Rowe, III et al. |
| 2004/0078256 A1 | 4/2004 | Glitho et al. |
| 2004/0078257 A1 | 4/2004 | Schweitzer et al. |
| 2004/0078373 A1 | 4/2004 | Ghoneimy et al. |
| 2004/0083448 A1* | 4/2004 | Schulz .................. G06Q 10/06 717/101 |
| 2004/0093263 A1 | 5/2004 | Doraisamy et al. |
| 2004/0093290 A1 | 5/2004 | Doss et al. |
| 2004/0098269 A1 | 5/2004 | Wise et al. |
| 2004/0107256 A1 | 6/2004 | Odenwald et al. |
| 2004/0116115 A1 | 6/2004 | Ertel |
| 2004/0122721 A1 | 6/2004 | Lasorsa |
| 2004/0128173 A1 | 7/2004 | Salonen |
| 2004/0139151 A1 | 7/2004 | Flurry et al. |
| 2004/0148185 A1 | 7/2004 | Sadiq |
| 2004/0148207 A1 | 7/2004 | Smith et al. |
| 2004/0148566 A1 | 7/2004 | Jaffar et al. |
| 2004/0153348 A1 | 8/2004 | Garback |
| 2004/0153350 A1 | 8/2004 | Kim et al. |
| 2004/0158493 A1 | 8/2004 | Nicholson |
| 2004/0161097 A1 | 8/2004 | Henry |
| 2004/0181572 A1 | 9/2004 | Lee et al. |
| 2004/0184593 A1 | 9/2004 | Elsey et al. |
| 2004/0186891 A1 | 9/2004 | Panec et al. |
| 2004/0187089 A1* | 9/2004 | Schulz .................. G06Q 10/06 717/101 |
| 2004/0193432 A1 | 9/2004 | Khalidi |
| 2004/0193457 A1 | 9/2004 | Shogren |
| 2004/0199423 A1 | 10/2004 | LaBrosse et al. |
| 2004/0203909 A1 | 10/2004 | Koster |
| 2004/0215472 A1* | 10/2004 | Gleckman ............ G06Q 10/107 709/206 |
| 2004/0220854 A1 | 11/2004 | Postrel |
| 2004/0224703 A1 | 11/2004 | Takaki et al. |
| 2004/0248551 A1 | 12/2004 | Rowitch et al. |
| 2004/0249758 A1 | 12/2004 | Sukeda et al. |
| 2004/0267611 A1 | 12/2004 | Hoerenz |
| 2005/0004819 A1 | 1/2005 | Etzioni et al. |
| 2005/0010464 A1 | 1/2005 | Okuno et al. |
| 2005/0010472 A1 | 1/2005 | Quatse et al. |
| 2005/0015293 A1* | 1/2005 | Henn ................ G06Q 10/06311 705/7.13 |
| 2005/0021424 A1* | 1/2005 | Lewis .................... G06Q 10/02 705/5 |
| 2005/0027570 A1 | 2/2005 | Maier et al. |
| 2005/0033614 A1 | 2/2005 | Lettovsky et al. |
| 2005/0033615 A1 | 2/2005 | Nguyen et al. |
| 2005/0033616 A1 | 2/2005 | Vavul et al. |
| 2005/0033670 A1 | 2/2005 | Cheng et al. |
| 2005/0040944 A1 | 2/2005 | Contestabile |
| 2005/0053220 A1 | 3/2005 | Helbling et al. |
| 2005/0066304 A1 | 3/2005 | Tattrie et al. |
| 2005/0086098 A1 | 4/2005 | Fulton et al. |
| 2005/0096929 A1 | 5/2005 | Gelormine et al. |
| 2005/0101335 A1 | 5/2005 | Kelly et al. |
| 2005/0111642 A1 | 5/2005 | Terada et al. |
| 2005/0119927 A1 | 6/2005 | Patel |
| 2005/0125265 A1 | 6/2005 | Bramnick et al. |
| 2005/0125268 A1 | 6/2005 | Danninger et al. |
| 2005/0125408 A1 | 6/2005 | Somaroo et al. |
| 2005/0125804 A1 | 6/2005 | Dievendorff et al. |
| 2005/0131761 A1 | 6/2005 | Trika et al. |
| 2005/0138631 A1 | 6/2005 | Bellotti et al. |
| 2005/0143064 A1 | 6/2005 | Pines et al. |
| 2005/0149385 A1 | 7/2005 | Trively |
| 2005/0197953 A1* | 9/2005 | Broadbent ............ G06Q 10/10 705/38 |
| 2005/0203757 A1* | 9/2005 | Lei ........................ G06Q 10/06 705/7.27 |
| 2005/0209902 A1 | 9/2005 | Iwasaki et al. |
| 2005/0209914 A1 | 9/2005 | Nguyen et al. |
| 2005/0215247 A1 | 9/2005 | Kobylarz |
| 2005/0222890 A1 | 10/2005 | Cheng et al. |
| 2005/0228677 A1 | 10/2005 | McCabe et al. |
| 2005/0233743 A1 | 10/2005 | Karaoguz et al. |
| 2005/0234928 A1 | 10/2005 | Shkvarchuk et al. |
| 2005/0255861 A1 | 11/2005 | Wilson et al. |
| 2005/0288948 A1 | 12/2005 | Devulapalli et al. |
| 2005/0288974 A1* | 12/2005 | Baranowski .......... G06Q 10/02 705/6 |
| 2006/0004590 A1 | 1/2006 | Khoo |
| 2006/0004613 A1 | 1/2006 | Roller et al. |
| 2006/0009987 A1 | 1/2006 | Wang |
| 2006/0010023 A1 | 1/2006 | Tromczynski et al. |
| 2006/0059023 A1 | 3/2006 | Mashinsky |
| 2006/0059024 A1 | 3/2006 | Bailey et al. |
| 2006/0059107 A1 | 3/2006 | Elmore et al. |
| 2006/0068787 A1 | 3/2006 | Deshpande et al. |
| 2006/0080257 A1 | 4/2006 | Vaughan et al. |
| 2006/0080321 A1 | 4/2006 | Horn et al. |
| 2006/0085512 A1 | 4/2006 | Handel et al. |
| 2006/0095329 A1 | 5/2006 | Kim |
| 2006/0095377 A1 | 5/2006 | Young et al. |
| 2006/0106655 A1 | 5/2006 | Lettovsky et al. |
| 2006/0107265 A1 | 5/2006 | Schulz et al. |
| 2006/0111955 A1 | 5/2006 | Winter et al. |
| 2006/0136279 A1* | 6/2006 | Maybee ............ G06Q 10/06316 705/7.26 |
| 2006/0171337 A1 | 8/2006 | Shaffer et al. |
| 2006/0178932 A1 | 8/2006 | Lang |
| 2006/0224969 A1 | 10/2006 | Marston |
| 2006/0277079 A1 | 12/2006 | Gilligan et al. |
| 2006/0287897 A1 | 12/2006 | Sobalvarro et al. |
| 2006/0293931 A1 | 12/2006 | Fitzgerald et al. |
| 2007/0005406 A1 | 1/2007 | Assadian et al. |
| 2007/0016439 A1 | 1/2007 | Stiles et al. |
| 2007/0016514 A1 | 1/2007 | Al-Abdulqader et al. |
| 2007/0038498 A1 | 2/2007 | Powell et al. |
| 2007/0060099 A1 | 3/2007 | Ramer et al. |
| 2007/0150075 A1 | 6/2007 | Dumas et al. |
| 2007/0150349 A1 | 6/2007 | Handel et al. |
| 2007/0174438 A9 | 7/2007 | Johnson et al. |
| 2007/0185744 A1 | 8/2007 | Robertson |
| 2007/0198432 A1 | 8/2007 | Pitroda et al. |
| 2007/0266045 A1* | 11/2007 | Bansal .................... H04L 67/22 |
| 2008/0004917 A1 | 1/2008 | Mortimore |
| 2008/0004918 A1 | 1/2008 | Orttung et al. |
| 2008/0004919 A1 | 1/2008 | Stubbs |
| 2008/0004921 A1 | 1/2008 | Orttung et al. |
| 2008/0004980 A1 | 1/2008 | Hernandez |
| 2008/0010100 A1 | 1/2008 | Orttung et al. |
| 2008/0013130 A1 | 1/2008 | Sasaki |
| 2008/0046298 A1 | 2/2008 | Ben-Yehuda et al. |
| 2008/0052217 A1 | 2/2008 | Etkin |
| 2008/0065509 A1 | 3/2008 | Williams |
| 2008/0086564 A1 | 4/2008 | Putman et al. |
| 2008/0091477 A1 | 4/2008 | Mortimore |
| 2008/0091478 A1 | 4/2008 | Messa |
| 2008/0091479 A1 | 4/2008 | Mortimore |
| 2008/0126143 A1 | 5/2008 | Altman et al. |
| 2008/0141158 A1 | 6/2008 | Daughtrey |

(56) References Cited

U.S. PATENT DOCUMENTS

| | | |
|---|---|---|
| 2008/0147450 A1 | 6/2008 | Mortimore |
| 2008/0155470 A1 | 6/2008 | Khedouri et al. |
| 2008/0201197 A1 | 8/2008 | Orttung et al. |
| 2008/0201432 A1 | 8/2008 | Orttung et al. |
| 2008/0228547 A1 | 9/2008 | Doss et al. |
| 2008/0319808 A1* | 12/2008 | Wofford .............. G06Q 10/02 705/6 |
| 2009/0006143 A1 | 1/2009 | Orttung et al. |
| 2009/0030609 A1 | 1/2009 | Orttung et al. |
| 2009/0030742 A1 | 1/2009 | Orttung et al. |
| 2009/0030769 A1 | 1/2009 | Orttung et al. |
| 2009/0089101 A1* | 4/2009 | Hashim .............. G06Q 10/0633 705/4 |
| 2009/0210261 A1 | 8/2009 | Mortimore, Jr. |
| 2009/0248457 A1 | 10/2009 | Munter et al. |
| 2010/0017371 A1 | 1/2010 | Whalin et al. |

OTHER PUBLICATIONS

Method and System for Automatic Scheduling of Multiple Subgroup Meetings, U.S. Appl. No. 11/121,863, filed May 3, 2005, Shantanu Patwardhan, et al, Docketed New Case—Ready for Examination, Sep. 4, 2014.

Intelligent Meeting Planner, U.S. Appl. No. 11/026,798, filed Dec. 30, 2004, Mark Orttung, et al, Final Rejection dated Oct. 14, 2008.

Method and System for Enhanced Visual Meeting and Schedule Planner, U.S. Appl. No. 11/177,997, filed Jul. 7, 2005, Purvi Shah, et al, Non Final Action dated Oct. 7, 2008.

Chance Meeting Addition to Trip Planner or Meeting Planner, U.S. Appl. No. 11/177,793, filed Jul. 7, 2005, Mark Orttung, et al, Final Rejection dated Feb. 4, 2009.

Method and System for Transferring of Stateful Screen in a Stateless Session, U.S. Appl. No. 11/323,766, filed Dec. 30, 2005, Rick Hernandez, et al, Docketed New Case—Ready for Examination, Oct. 27, 2007.

Alag, Satnam et al., U.S. Appl. No. 11/067,537, entitled "Platform for Multi-service Procurement," filed Feb. 24, 2005.

Amendment and Response to Non-Final Office Action filed at the US Patent &Trademark Office dated Oct. 27, 2008, for U.S. Appl. No. 11/388,360.

Chakravarthy, Sriam et al., U.S. Appl. No. 11/178,107, entitled "Asynchronous, Location-Independent Web Service Invocation", filed Jul. 7, 2005.

Grady, Patrick et al., U.S. Appl. No. 10/338,363, entitled "Automatic Services Exchange", filed Jan. 7, 2003.

Grady, Patrick et al., U.S. Appl. No. 10/855,269, entitled "Coordination for Group Procurement of Services", filed May 26, 2004.

Handel, Sean et al., U.S. Appl. No. 11/321,769, entitled "Method and System for Prediction and Delivery of Time and Context Sensitive Services", filed Dec. 28, 2005.

Handel, Sean et al., U.S. Appl. No. 11/388,360, entitled "Method and System for Traffic Tracking and Conversion Tracking", filed Mar. 23, 2006.

Handel, Sean et al., U.S. Appl. No. 11/388,540, entitled "Method and System for Resource for Planning for Service Provider", filed Mar. 23, 2006.

Handel, Sean et al., U.S. Appl. No. 11/395,413, entitled "Method and System for Viral Distribution of Short-term Location Orientated Offers", filed Mar. 30, 2006.

Hernandez, Rick et al., U.S. Appl. No. 11/323,766, entitled "Method and System for Transferring of Stateful Screen in a Stateless Session", filed Dec. 30, 2005.

Hwang, Yong Ho et al., "An efficient revocation scheme for stateless receievers," Editors: Katsikas-S-K, Gritzalis-S, Lopez-J, Jun. 2004, pp. 1-2.

Paranadi, Shiva et al., U.S. Appl. No. 11/315,421, entitled "Method and System for Interacting via Messages with a Travel Services System", filed Dec. 21, 2005.

Patwardhan, Shantau et al., U.S. Appl. No. 11/121,861, entitled "Method and System for Reporting Work Hours by Phone or Other E-Media", filed May 3, 2005.

Patwardhan, Shantau et al., U.S. Appl. No. 11/178,032, entitled "Method and System for Booking an Open Return Ticket Online", filed Jul. 7, 2005.

Albright, Peggy, "Companies Send Strong Message About Saving Money," Wireless Week, vol. 7, Issue 29, p. 24, Jul. 16, 2001.

Business Editors/High-Tech Writers, "GetThere to Integrate and Resell Talaris' Web Services Offering to Complement Leading Corporate Online Travel Reservation System," Business Wire, San Francisco, p. 1, Oct. 15, 2001.

Business Editors/High-Tech Writers, "Talaris and GetThere Provide Enterprises with New Set of Online Business Services,"Business Wire, New York, p. 1, Oct. 15, 2001.

General Services Administration, "Integrated, Automated Information System (IAIS)," Request for Information, provided by Federal Information & News Dispatch, Inc., FedBizOpps, Jan. 30, 2003.

Hopkinson, Natalie, "Online Invitations Transform Party Life (Final Edition)," Journal—Gazette, Fort Wayne, Indiana, p. 2.D, Dec. 31, 2002.

Patwardhan, Shantanu et al., U.S. Appl. No. 11/121,863, entitled "Method and System for Automatic Scheduling of Multiple Subgroup Meetings," filed May 3, 2005.

Shah, Purvi et al., U.S. Appl. No. 11/177,997, entitled "Method and System for Enhanced Visual Meeting and Schedule Planner," filed Jul. 7, 2005.

* cited by examiner

🅔 Airlines, Sun Nov 21. Microsoft Internet Explorer
Tools   Help

🔍 Search ⭐ Favorites 🎵 Media ... — 500

Settings\northung\Mark's Data\Products\OldDocs\Travelprototypes\Email Demov3\Small Grapemailv1.htm
— 501

TALARIS
Group Member Itinerary Booked For
Forrester Research Meeting
November 24, 2002
9AM - 2PM (EBT)
24 Forrester Place
Waltham, MA  02323
502

Patrick Grady Has booked his itinerary for the Forrester Research Meeting. Please use the buttons at the end of the email to book a similar itineray.

San Francisco (SFO) to Boston (BOS)
Flights: American Airlines #194
Departure: Sunday, November 23 at 2:05 PM
Arrival: Sunday, November 23 at 10:31 PM
Seating: Economy Class, 20F Boston (BOS) to San Francisco (SFO)
Flights: American Airlines #197
Departure: Monday, November 24 at 8:10 PM
Arrival: Sunday, November 24 at 8:37 PM
Seating: Economy Class, 10C
503

Hotel: LE MERIDIEN BOSTON
250 Franklin St, Boston, MA 02110
1 517 451 1900 View Map
Check-in: Sunday, November 23
Check-out: Monday, November 24

Car: Hertz
On Airport (BOS)
Class: Compact
Pick-up: Sunday, November 23
Drop-off: Monday, November 24

511 — 512 — 513
Book Identical Itinerary  Book Air and Hotel, Share Car  Meet at Airport, Share car
Meet at Hotel —514
510

Thank for using Teleris.  Have a great meeting.

FIG. 5

(Formerly Figure 1B)

PLATFORM FOR MULTI-SERVICE PROCUREMENT

RELATED APPLICATIONS

The present application is a continuation application of U.S. patent application Ser. No. 11/067,537, filed on Feb. 24, 2005 and entitled "Platform for multi-service procurement", which claims the benefit of U.S. Provisional Patent Application No. 60/608,725, filed on Sep. 10, 2004 and entitled "Platform for Multi-Procurement and Management of a Large Number of Configurable Parameters", the entire disclosures of which applications are hereby incorporated herein by references.

The present application is related to U.S. Provisional Patent Application No. 60/347,769, filed on Jan. 9, 2002 and entitled "Automatic Services Exchange", and U.S. patent application Ser. No. 10/338,363 filed Jan. 7, 2003 and entitled "Automatic Services Exchange", the entire disclosures of which applications are hereby incorporated herein by references.

FIELD OF THE INVENTION

This invention relates generally to procurement of services, and more particularly to improving customer satisfaction in booking process.

BACKGROUND OF THE INVENTION

The increasingly mobile, remote and distributed nature of today's workforce makes it difficult for an organization to provide adequate administrative support for their workers. As a result, the workers themselves must spend part of their working day identifying, procuring, managing, coordinating and accessing the services they need to perform their job. Additionally, even people who are not mobile or remote workers find that they have less time to spend in organizing the services they need for their business or personal life.

This problem is further exacerbated when many workers must attend off-site events requiring travel plans including airfare, sleeping accommodations and local transportation. The distributed nature of the workforce could result in numerous people staying in varying hotels, renting individual cars and/or transportation to and from airports and event locations. This can add up to the redundant cost of travel-related services.

Another problem is the inherent lack of knowledge between workers as to who is attending a given event, further hindering a chance for coordinated travel arrangements. Online systems such as Evite, Yahoo Calendar and Microsoft Outlook have brought together group notices of events and meetings. This has allowed workers to know who has been invited and whether they plan to attend a given event. However such systems do not alleviate the problem of redundancy in the booking of event-related services to attend such off-site events. Organizations have an interest in reducing redundant expenses such as individual rental cars and hotel rooms. However, they often lack the bandwidth to coordinate a sharing of such services.

In generic terms, a service is a unit of work done by a service provider to achieve desired end results for a service consumer. For such a broad, generic application, many different aspects apply. For example, there is no inventory in the classic sense, as, for example, unused seats on a flight just departed may no longer be sold. On the other hand, as some people do not come to their flights (no-shows), airlines typically overbook flights, meaning, they typically sell more seats than are available, following statistical patterns of no-show behavior, occasionally leading to overbooking, etc. Therefore, a system interacting with such types of services requires capabilities to deal with the type of issues that can occur.

SUMMARY OF THE INVENTION

The present invention describes an on demand service provisioning system to interface with suppliers and customers. One embodiment of the present invention includes a database to store information on customers, suppliers and transactions; a module to interface customers; a module to interface suppliers; a module to interface the database; a stateful section including the module to interface with the database; and a stateless section including the module to interface with the customers and the suppliers.

BRIEF DESCRIPTION OF THE DRAWINGS

FIG. 5 illustrates screen shot as it would be seen by a group member, in accordance with one embodiment.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Automatic Service Exchange

Figure 1A:
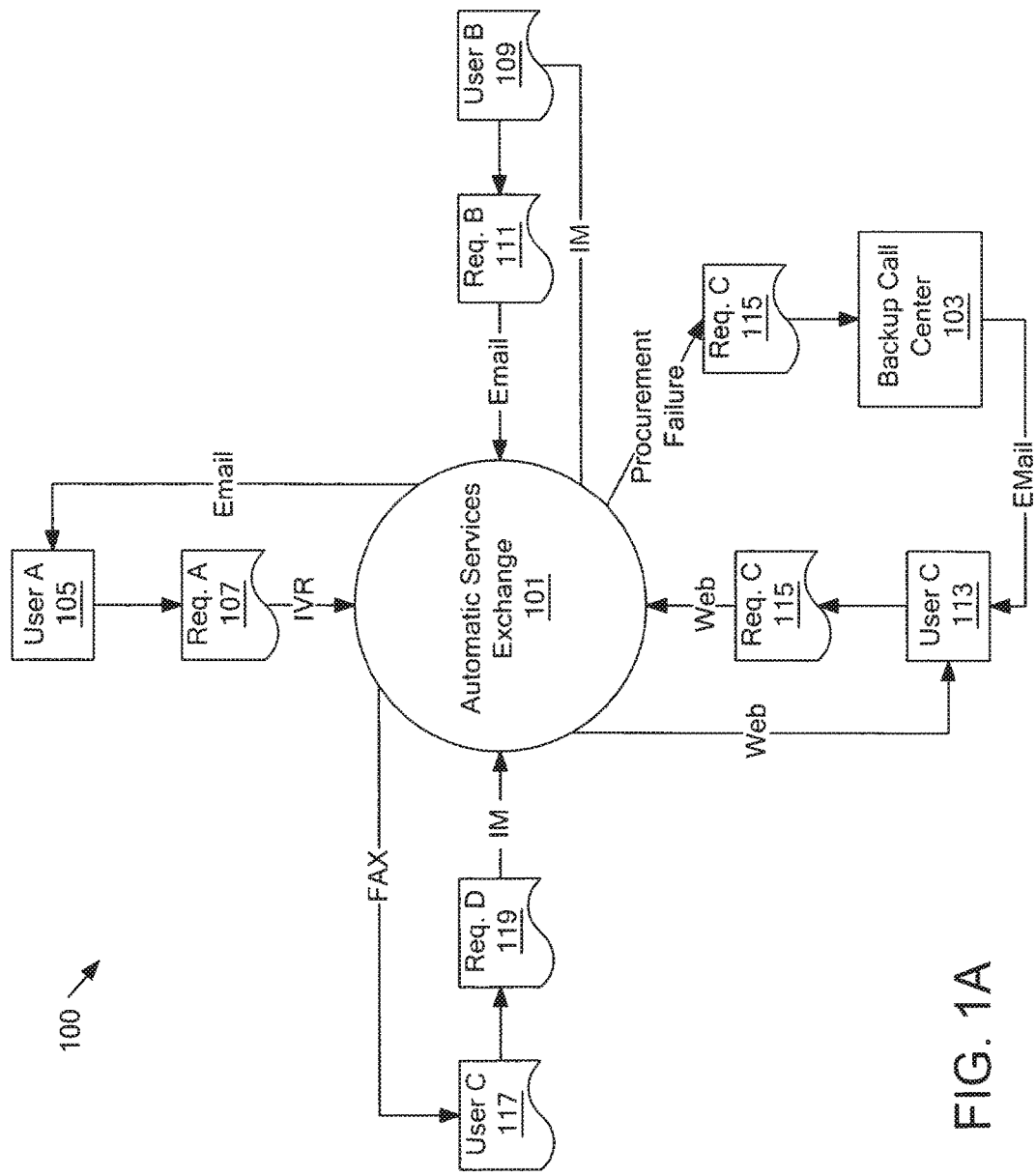
FIGS. 1A-1C are diagrams illustrating a system-level overview of an embodiment of the invention.

A system level overview of the operation of one embodiment of an automatic services exchange system 100 is described by reference to FIGS. 1A-1C. In FIG. 1A, the automatic services exchange system 100 is illustrated as having an automatic services exchange component 101 and an optional call center backup component 103. The automatic services exchange component 101 allows users such as a user A 105, user B 109, user C 113, and user D 117 to request services from the exchange. The service requests may be sent to the exchange component 101 through various communication media. For example, user A 105 sends its request A 107 to the exchange component 101 through an interactive voice response system (IVR), user B 109 sends its request B 111 to the exchange component 101 through e-mail (typically a structured e-mail), user C 113 sends its request C 115 via a Web browser, such as Internet Explorer or Netscape or a micro-browser on a WAP enabled cellular telephone, and user D 117 send its request D 119 through an instant messaging system (IM). These different communication media typically have different data formats, such as structured e-mail, or an Internet based markup language such as XML, or IVR voice recognition. Regardless of the communication media used to send the request to the exchange component 101, a response to a request may be sent back to the user through a different media. Thus, FIG. 1A illustrates that user A 105 receives its response through e-mail, user B 109 receives its response via instant messaging, and user D 117 receives its response via fax. In the case of user C 113, the same communication medium, Web, used to send the request is also used to send the response.

The services available through the exchange component 101 include travel services, entertainment service, personal services (e.g., haircutting), educational services, business administrative services and the like. Some services may be time critical, e.g., a dinner reservation at a particular time. The service request specifies other required criteria for the service, such as location (e.g., a certain geographic area), type, duration, quantity, price information (e.g., preferred price or price range and maximum price), etc. Additionally, a single service request may actually require services from multiple different service providers which are linked or associated. For example, if a user is planning a business trip, the request will often require services from airlines, hotels and car rental agencies and perhaps other services which are linked to or associated with the business trip.

The automatic services exchange component 101 automatically sends the service request to various service providers. In one embodiment, this transmission may be through several different electronic communication media such as structured e-mail, XML, IVR, etc. In the event that the exchange component 101 is unable to automatically procure the service requested by the user, the request is transferred to the backup call center component 103. For example, assume that request C 115 from user C 113 could not be automatically fulfilled by the exchange component 101. As illustrated in FIG. 1A, the request C 115 is sent to the backup call center 103 along with other information such as which service providers have already been contacted for the service. One of the human agents or operators at the backup call center 103 attempts to find a service provider for the request. Once the backup call center 103 determines that the request can or cannot be satisfied, it communicates the result to the corresponding user who made the request. In the example, the result is sent to user C 113 through e-mail.

Figure 1B:
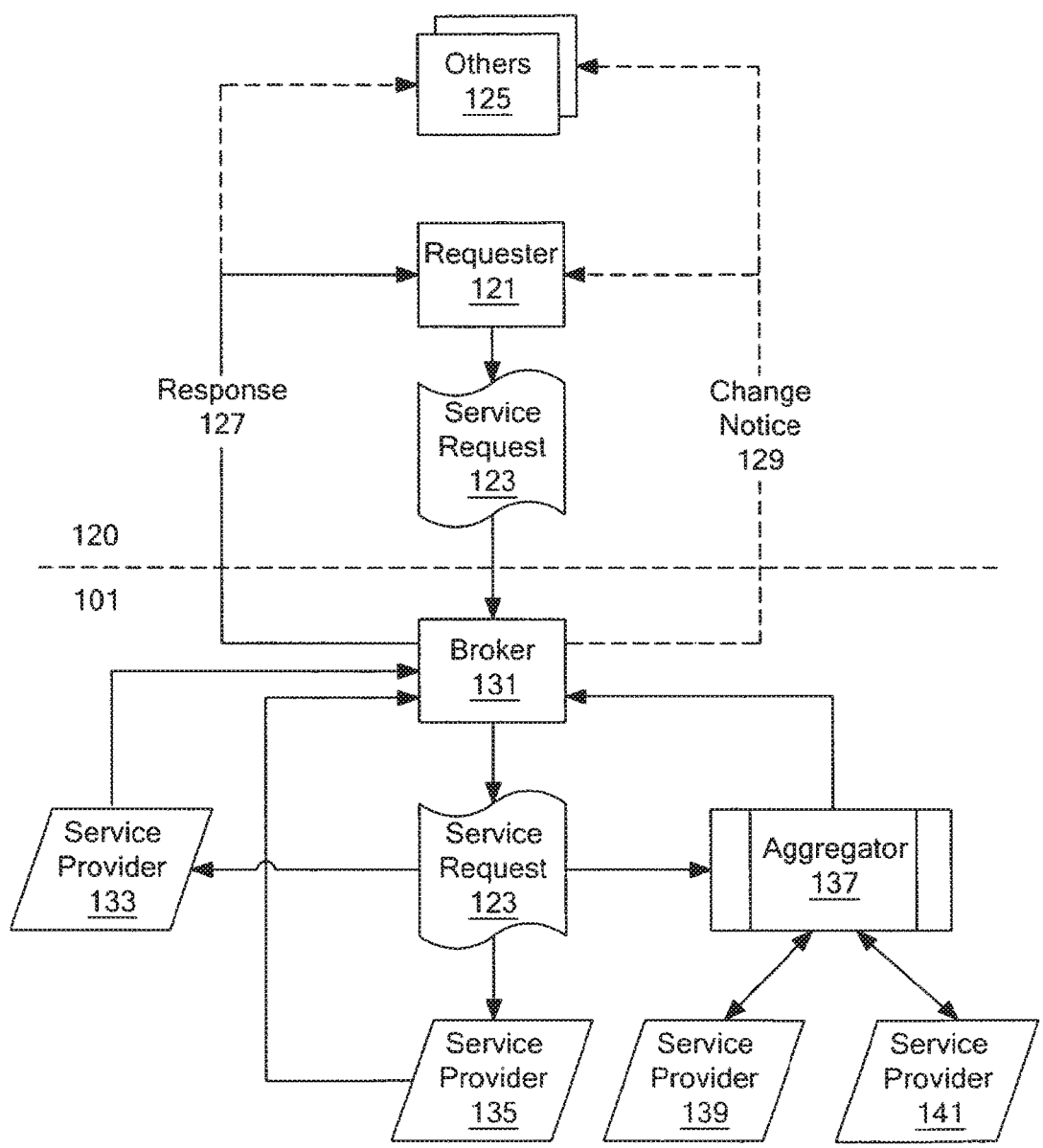
Figure 1C:
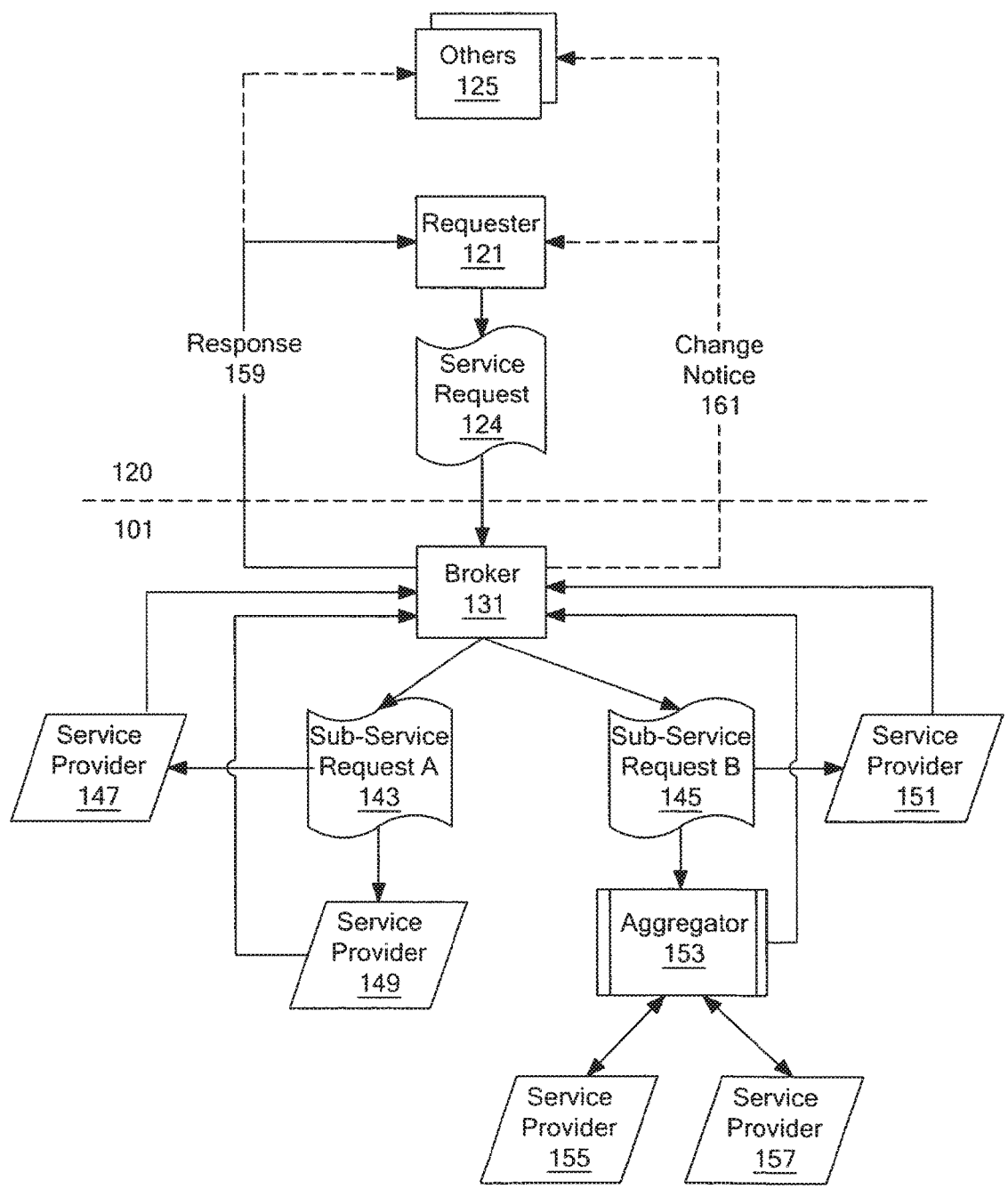

FIGS. 1B and 1C show the operation of the automatic services exchange component 101 in more detail. In FIG. 1B, a requestor 121 sends a service request 123 to the automatic services exchange 101. A broker function 131 receives a service request and passes it onto various service providers, such as service provider 133 and service provider 135. The service request may also be sent to an aggregator that represents multiple service providers, such as aggregator 137 that handles requests for service provider 139 and service provider 141, instead of directly to the service providers. In one embodiment, the service request is sent using an automatic system, such as an IVR system, that asks for a positive or negative reply to the request (e.g., a voice over the telephone says "press 1 if you have a table for two at 6:30 p.m. at your restaurant on XYZ date, press 2 if you do not"). Each of the service providers 133, 135 and the aggregator 137 replies to the broker 131 indicating whether they are able to provide the requested service. The responses to broker 131 may be through different communication media such as the Internet (e.g., via an XML page), structured e-mail, or IVR.

Assuming there is at least one positive reply, the broker 131 sends a response 127 to the requestor 121 with the results indicating at least one response matched the request. Depending on parameters set by the requestor 121, if multiple positive replies are received by the broker 131, the broker may choose the best match based on the required or predetermined criteria or it may send responses for all the positive replies to the requestor 121 for selection. The requestor 121 may also authorize the broker 131 to contract for the service under certain circumstances without waiting for approval from the requestor 121. A match to request typically means that the response from the service provider is within the range of acceptable requesting parameters such as time of service, location of service, price of service, level (e.g., quality requested) of service, and other parameters specified by the request.

As illustrated in phantom in FIG. 1B, the broker 131 may also send the response 127 to others 125 specified by the requestor 121. For example, when multiple people are planning a dinner, one person, the requester 121, may be in charge of obtaining the reservation, but the other people involved should receive notification of the particulars.

Also shown in phantom in FIG. 1B, is the capability of sending a change notice 129 to the requestor 121 if a procured service changes before its performance date. This change may occur by a modified request which is issued by the requestor 121. Similarly, the change notice 129 may also be sent to others 125 specified by the requestor 121. The requester can approve the change if the change is satisfactory, or submit a new service request if the change is unsatisfactory, or if the service is now unavailable from the original provider (not shown). The exchange system of the invention, in one embodiment, can automatically respond to a modified request.

The broker 131 reviews, through an automatic machine implemented process, the service requests to determine if the service request is actually a request for multiple services, such as multiple services which are linked or associated such as those associated with an event (e.g., a business trip which requires airline tickets, rental car reservation and hotel reservation). The resulting operation is illustrated in FIG. 1C. The broker 131 breaks such a request into sub-service requests 143 and 145 and sends each to the appropriate service providers. Thus, in FIG. 1C, sub-service request A 143 is sent to service providers 147, 149, while sub-service request B 145 is sent to service provider 151 and aggregator 153, which aggregates the services from service providers 155 and 157. As before, each service provider/aggregator typically returns a message to the broker 131 specifying its ability to provide the service. Each sub-service response 159 may be sent separately to the requestor 121 or the broker 131 may wait until all service providers/aggregators have responded or until a match to each sub-service request has been found. As in FIG. 1C, change notices 161 also will be sent to the user 121 upon a change in a procured service. Additionally, the responses 159 and the change notices 161 may be sent to others 125 specified by the requestor 121.

The particular methods of the invention are now described in terms of computer software with reference to a series of flowcharts. The methods to be performed by a computer constitute computer programs made up of computer-executable instructions illustrated as blocks (acts). Describing the methods by reference to a flowchart enables one skilled in the art to develop such programs including such instructions to carry out the methods on suitably configured computers (e.g., the processor of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 2A:
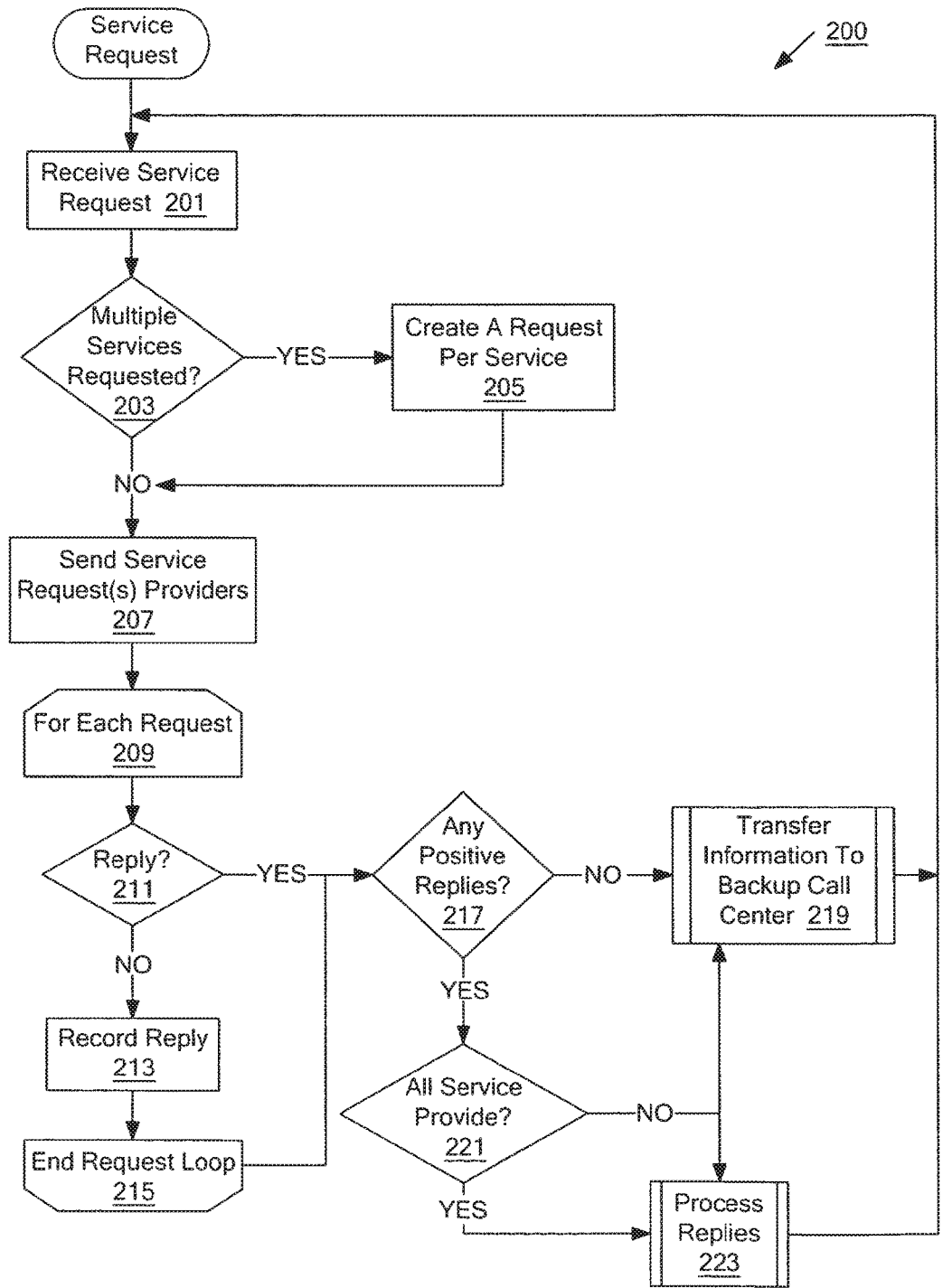
FIGS. 2A-2C are flowcharts of methods to be performed typically by computers in executing the embodiment of the invention illustrated in FIGS. 1A-1C.
Figure 2B:
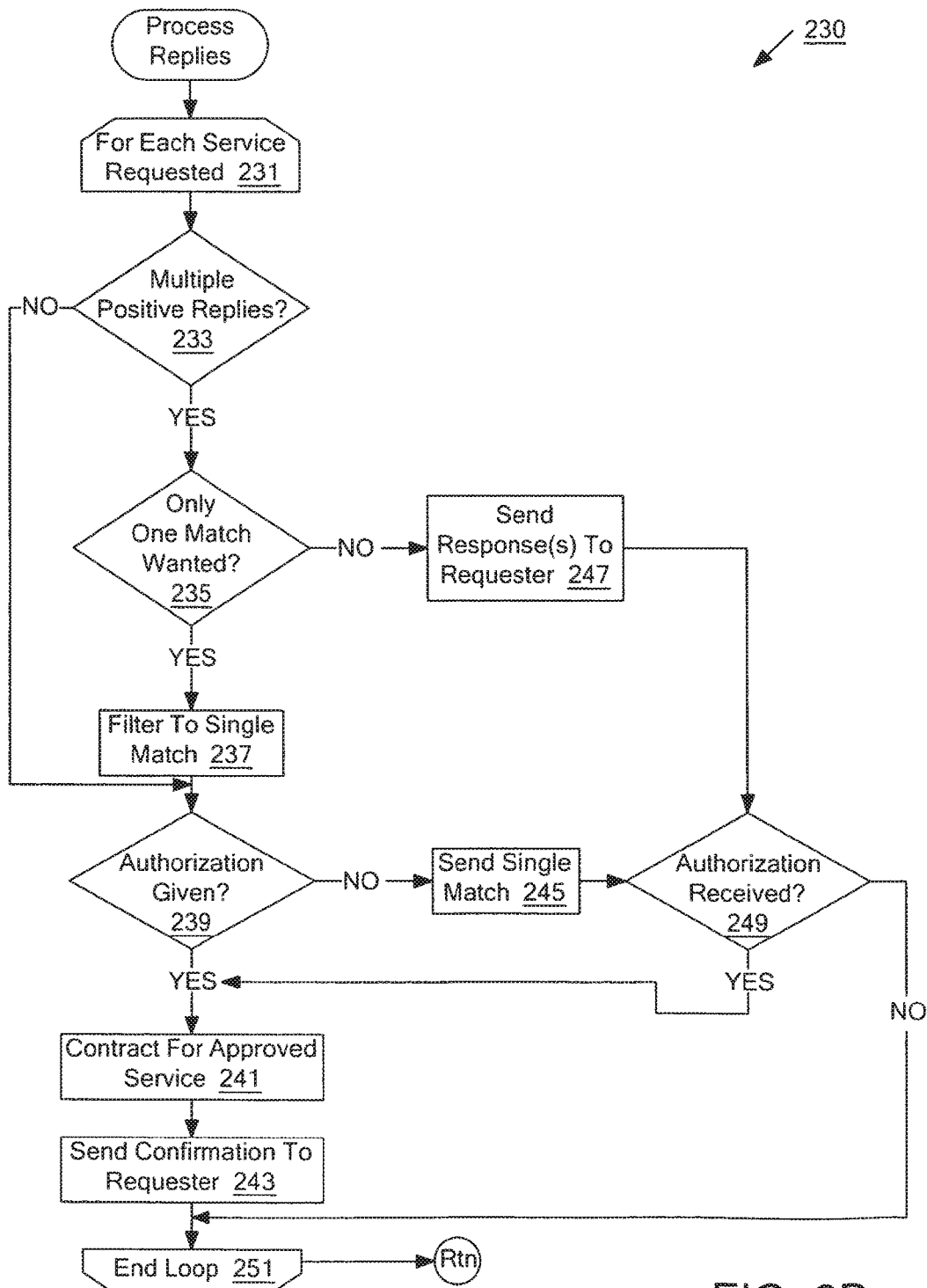
Figure 2C:
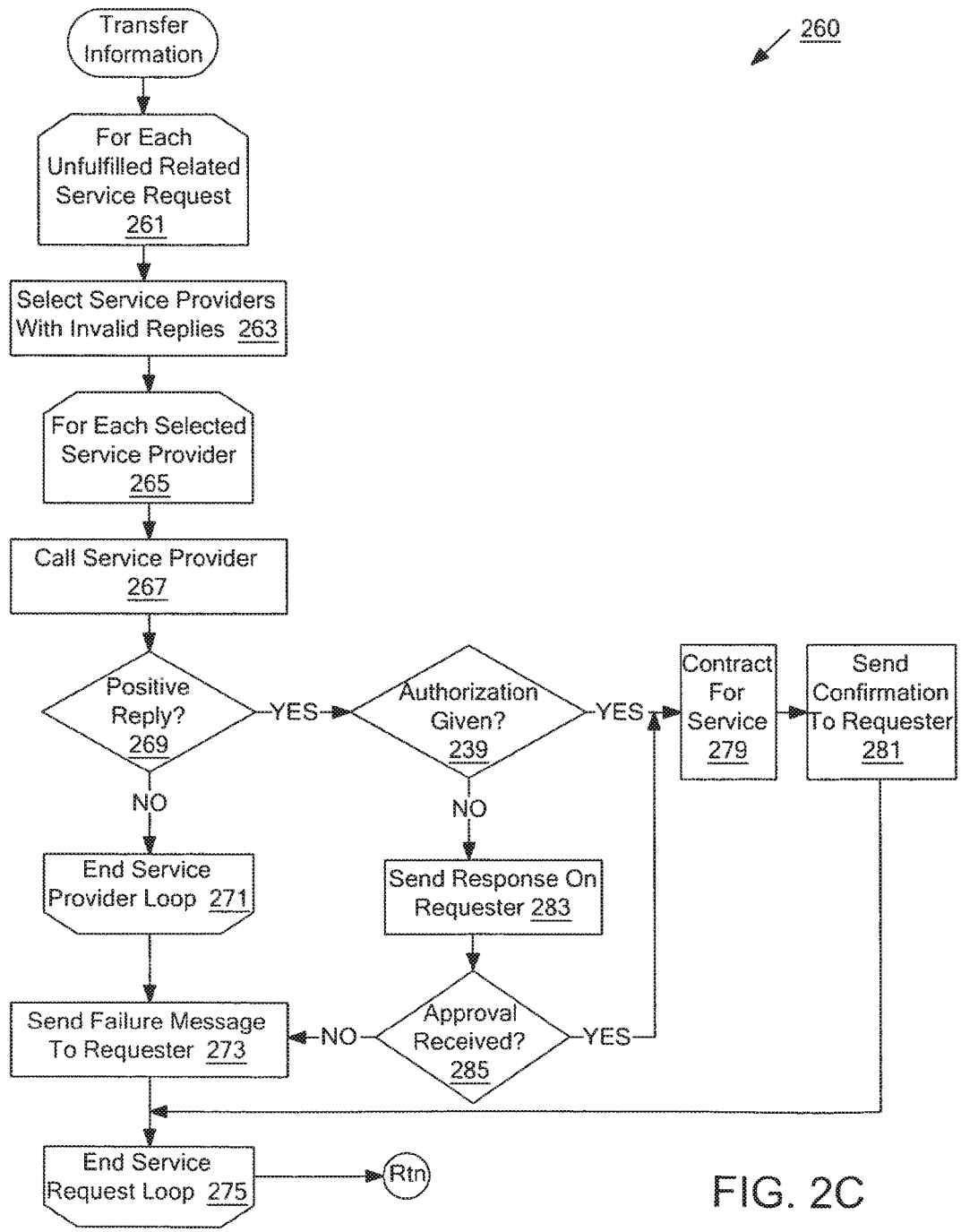
Figure 3:
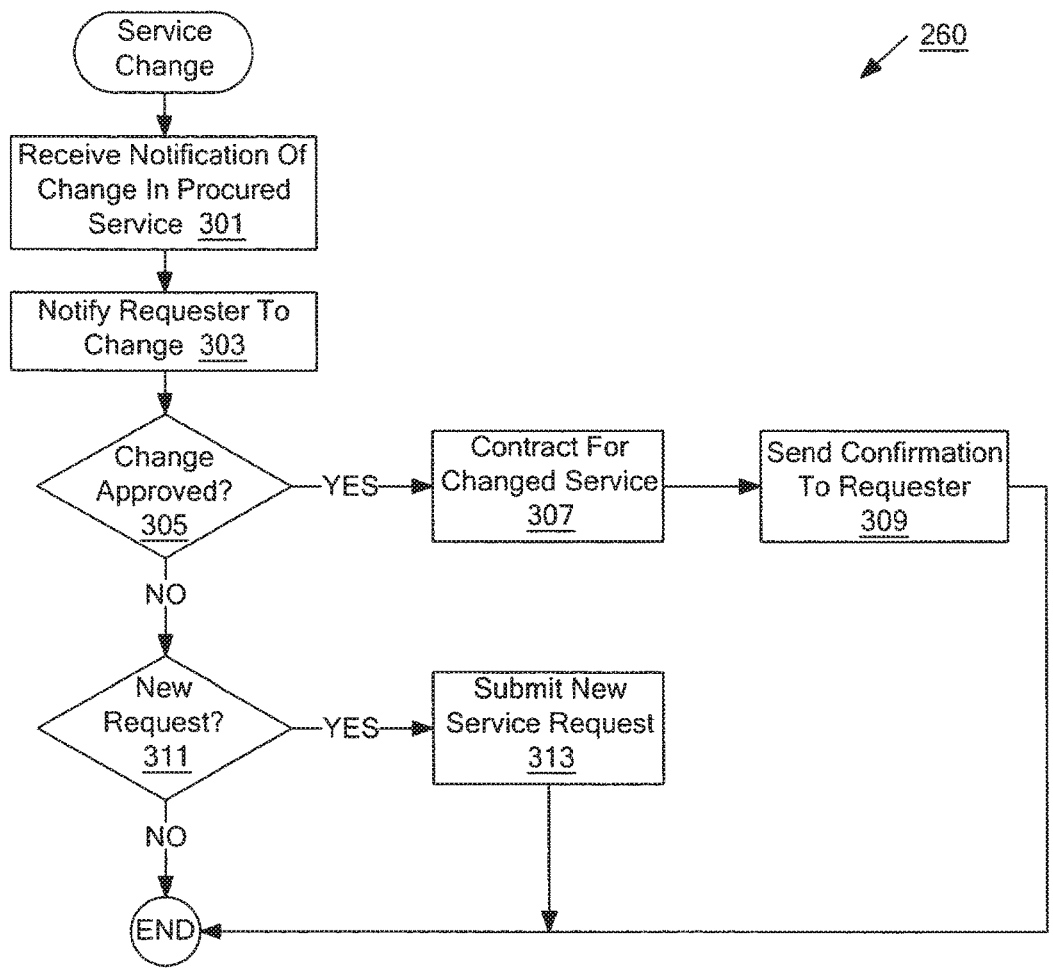
FIG. 3 is a flowchart of an optional method to be performed by a computer in executing the embodiment of the invention illustrated in FIGS. 1A-1C.

FIGS. 2A and 2B illustrate the acts to be performed by a computer, or set of computers, acting as the automatic services exchange component 101 of FIG. 1A in processing service requests. FIG. 2C illustrates the acts to be performed by a computer acting in conjunction with the backup call center 103 in FIG. 1A. FIG. 3 illustrates the acts to be performed by the computer acting as the automatic services exchange component when the optional change notification is desired.

Referring first to FIG. 2A, a service request method 200 receives a service request method (block 201) and examines it to determine if there are multiple, related services requested (block 203). If so, the service request method 200 creates a request for each service (block 205). Once the multiple requests are created, or if there is only one request, the service requests are sent to the appropriate providers (including aggregators) for the services (block 207).

The service request method 200 processes the replies for each request separately as illustrated by request loop starting at block 209. It will be appreciated that multiple request loops may be running concurrently. The requestor may specify a time which is associated with a deadline for completion of a search for a match to a request. In one embodiment, the requestor specifies a predetermined required period of time (time out period or deadline) within which replies must be received or by which time the requestor should be contacted by the exchange to inform the requestor of the incomplete status of a request. In another embodiment, the time out period is determined by the method 200 based on time criteria specified in the request. The request loop waits at block 209 until an incoming reply is received or until the time out period expires. When the request loop is activated by an incoming reply (block 211), the reply is recorded at block 213. If all replies have not yet been received, the request loop returns to its wait state. If all replies have been received, the particular request loop ends (block 215) and the method 200 proceeds to block 217 to evaluate the replies. Alternatively, if the time out period expires before any or all replies are received, the method 200 also proceeds to block 217. The time out period can provide the exchange system with some time to attempt to "manually" (through the intervention of a human operator) procure the service with enough time before the service is actually required. If the user/requestor fails to specify a time out period, the exchange system may specify a default time out period which is at least several hours before the requested time of the service (e.g., a 4:30 p.m. time out for a dinner reservation at 7:30 p.m.) or at least one day before the requested date of the service. Further, this time out period also allows the requestor to be notified of a failure to procure a service before the time requested for the service so that the requestor can take appropriate actions.

At block 217, the method 200 determines if any positive replies were received. If not, the corresponding request is transferred to the backup call center (which includes human operators) for processing along with all replies (block 219) so the backup call center knows the current status of the request (e.g., who has replied to the request, who has not, etc.). The processing represented by block 219 is described in more detail in conjunction with FIG. 2C further below.

If multiple services were requested, the method 200 determines if at least one service provider has replied positively to each service request (block 221). Requests that cannot be procured are sent to the backup call center at block 219, while positive replies are processed at block 223 (e.g., by sending out confirmations to the requestor and the service providers to secure the providing of the service). Similarly, if only one service was requested and at least one reply is positive, the method 200 proceeds to block 223 to process the reply. The processing represented by block 223 is described next.

One embodiment of a process reply method 230 is illustrated in FIG. 2B. It will be appreciated that multiple instances of the method 230 may be executing simultaneously based on the number of service requests that were made. For each service requested (block 231), the process reply method 230 determines if multiple positive replies for a service were received (block 233). If so, but only one match has been requested (block 235), the method 230 filters the replies to find a single match that best satisfies the criteria specified by the requestor (or specified as defaults by the system of the exchange service) (block 237). If there was only one positive reply for the service, or once a single reply has been filtered out in block 237, the method 230 determines if the requestor has authorized the automatic services exchange system to automatically procure the service (block 239). If so, the method 230 contracts or otherwise reserves the service from the corresponding service provider (block 241) and sends a confirmation request confirmation to the requestor that the service has been procured (block 243). In these situations where the service provider requires a commitment (e.g., a down payment or a deposit) from the requestor, the automatic services exchange provides payment information (e.g., credit card name, number and expiration date) previously provided by the requestor to the automatic services exchange or requests that this information be provided by the requestor to either the exchange (so it can be forwarded to the service provider) or to the service provider directly. If, however, there is no authorization (block 239), the information in the reply is sent to the requestor at block 245 and the method 230 waits to receive approval from the requestor. If approval is received (block 249), the method 230 contracts for or otherwise reserves the approved service and sends a confirmation as previously described. However, if approval of the particular service is not received from the requestor, the service request is terminated.

If more than one match is wanted at block 235 (as specified by a predetermined preference sent by the requestor or as set as a default by a system of the exchange service), a response containing all positive replies is sent to the requestor for selection (block 247) and the method 230 waits to receive approval of one of the providers at block 249. As in the case of a single reply, the method 230 contracts for or otherwise reserves the service from the approved provider at block 241 and returns a confirmation message at block 243, or the request is terminated if no approval is received.

Turning now to FIG. 2C, one embodiment of an information transfer method 260 for a backup call center is illustrated. When the service request is sent to the providers through an automatic system, a reply may be invalid such as when a person, in response to questions from an IVR system, presses an incorrect digit on a telephone key pad or hangs up without replying or if the call is unanswered. For each unfulfilled related service request (block 261), the method 260 selects those service providers that gave invalid replies (block 263). Each of the selected service providers (block 265) will be called by a human agent (block 267) until one provider is able to provide the service (block 269) or until all have been called (block 271). If no service provider can fulfill the service request, the method 260 sends a failure message to the requester at block 273. If there are no further related service requests (block 251), the method 260 terminates.

The first positive reply at block 269 causes the method 260 to determine if the requester has authorized the automatic services exchange system to automatically procure the service (block 277). If so, the method 260 contracts or otherwise reserves the service from the corresponding service provider (block 279) and sends a confirmation request confirmation to the requestor that the service has been procured (block 281). If, however, there is no authorization at block 277, the information in the reply is sent to the requestor (block 283) and the method 260 waits to receive approval from the requestor. If approval is received (block 285), the method 260 contracts for or otherwise reserves the approved service and sends a confirmation as previously described. However, if approval of the particular service is not received from the requestor, a failure message is sent to the requester at block 272.

As described previously, the automatic services exchange system optionally can send change notices to the requester to alert him/her of changes in a procured service or receive a modified request from the requestor even after the services have been procured. One embodiment of a service change method 300 that communicates changes is illustrated in FIG. 3. When the method 300 receives notification of a change in a procured service (block 301), it notifies the requester and asks if the requester approves the change or wishes to submit a new service request (block 303). If the change is approved (block 305), a message is sent to the service provider to contract for the changed service (block 307) and the change is confirmed to the requester (block 309). If the change is not approved but a new service request is submitted (block 311), the new request is resubmitted into the automatic services exchange system at block 313.

The particular methods performed by computers acting as the automatic services exchange and backup call center components for one embodiment of the invention have been described with reference to flowcharts in FIGS. 2A-2C and 3, including all the acts from 201 until 223, from 231 until 251, from 261 until 285, and 301 until 313, respectively. It will be appreciated that more or fewer processes may be incorporated into the methods illustrated in FIGS. 2A-2C and 3 without departing from the scope of the invention and that no particular order is implied by the arrangement of blocks shown and described herein and that alternative orders of the operations are within the scope of the invention.

Figure 4A:
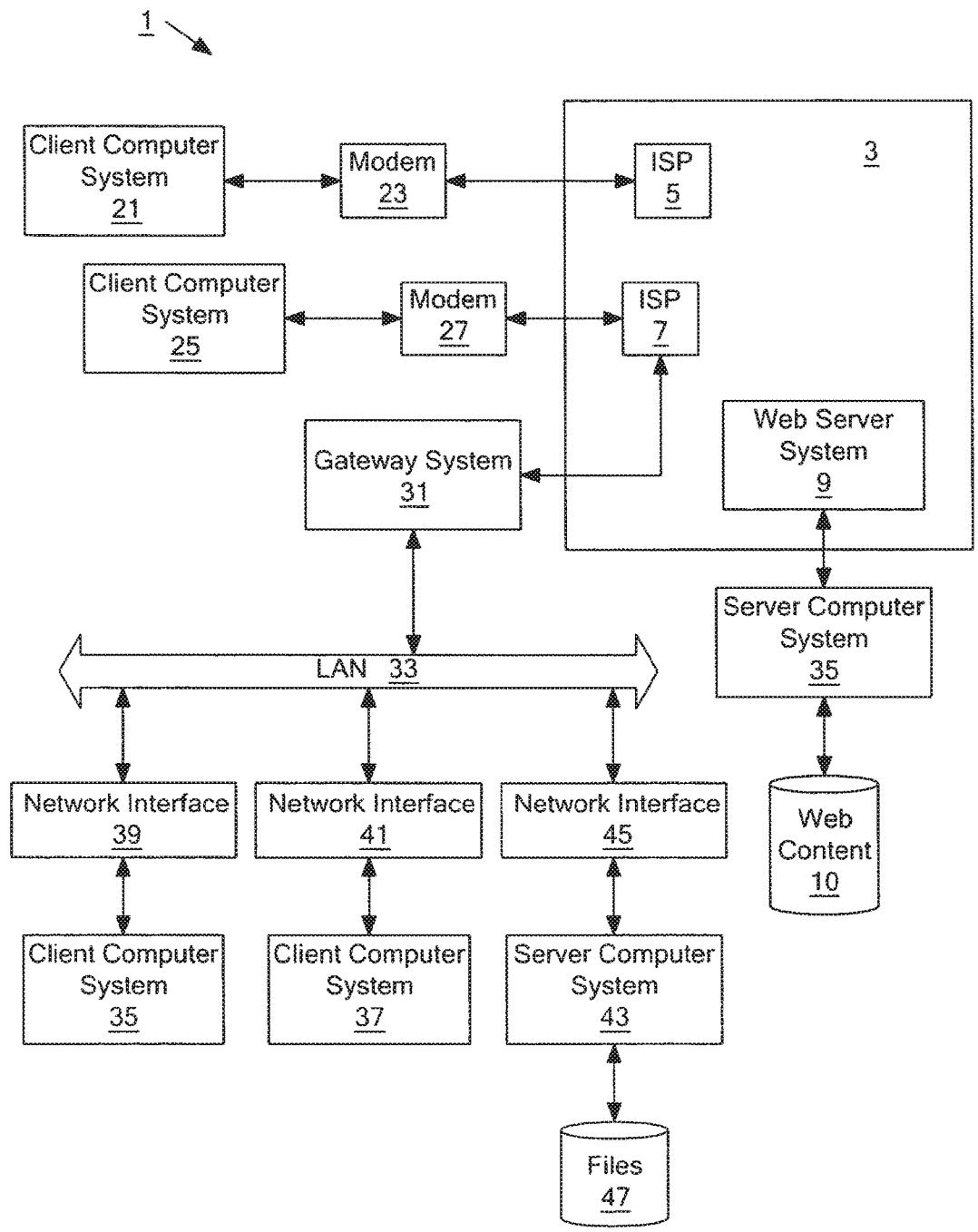
FIG. 4A is a diagram of one embodiment of an operating environment suitable for practicing the present invention.
Figure 4B:
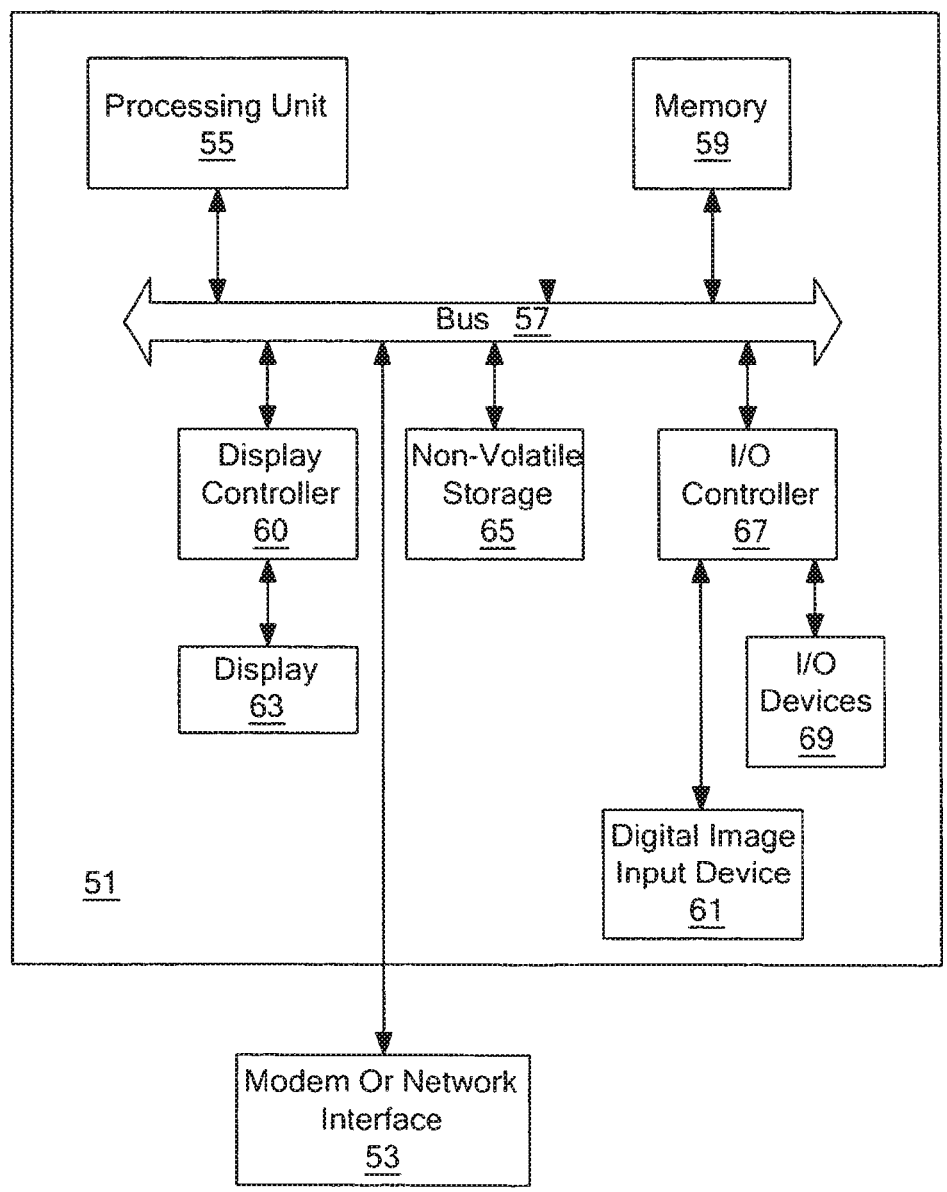
FIG. 4B is a diagram of one embodiment of a computer system suitable for use in the operating environment of FIG. 4A.

The following description of FIGS. 4A-B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices (e.g., PDAs—personal digital assistants such as a Palm Pilot; or cell phones, etc.), multiprocessor systems, microprocessor-based or programmable consumer electronics, network PCs, minicomputers, mainframe computers, and the like. The invention can also be practiced in distributed computing environments where tasks are performed by remote processing devices that are linked through a communications network having a physical or wireless infrastructure, or a combination of both.

FIG. 4A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7, through either physical or wireless interfaces. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld wireless device, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface (e.g., "Direct PC"), radio frequency (RF), cellular, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 4B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g., "Direct PC"), radio frequency (RF), cellular, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 61 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 4B, such as certain input or output devices. A typical computer system will usually include at least a processor, memory, and a bus coupling the memory to the processor. Further, mobile devices, such as PDAs, browsing web phones etc. and their respective supporting infrastructure may also be used as clients etc.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

Coordination for Group Procurement of Services

One embodiment of the present invention permits group members to add additional reservations onto an existing reservation of a group leader, supervisor or any other member of the group in such a manner as to synchronize travel plans and coordinate locations, etc., both in terms of travel time, sharing rides, staying at the same hotel, tee times, and other services one may desire when attending an event. But rather than book all group members at once, individual group members may make plans separately, to accommodate instances in which group members are, for example, traveling from different locations, or are arriving at different times, etc. For example, a sales person may be coming from a different customer site in another city, while the marketing person and the technical person may be coming from the home office.

FIG. 5 shows a screen as it would be seen by such a group member. The data as displayed on the screen may be shared with the group members via an Internet media, or other alternative media. Section 500 is the header bar of the browser window, and section 501 is the application window for a specific set of services—in this case, travel and accommodations for a business meeting at a customer site. Heading section 502 for the event shows that members of the company Talaris are visiting Forrester Research in Waltham, Mass. Group members can see the travel itinerary of the group leader respectively the first person to book travel in section 503. As each member books travel and other services related to the meeting, the system automatically notifies, via the Internet or other media, the other members of the group and asks if they want to book identical travel services or similar travel services (e.g., start in a different location and ultimately end up at a destination together at a specific time). The system automatically would also coordinate sharing of resources such as a rental car or hotel rooms. Further, the system would enforce corporate policies related to the services being procured. For example, the system might require employees to share a rental car, a limo, a shuttle bus etc. if two or more employees are traveling on a similar trip.

Thus in the example embodiment shown in FIG. 5, group members have the options shown in section 510 to choose one of four travel options. It is clear that in other example embodiments, other, similar options, additional options, or fewer options may be offered. Section 511 is an option to book an identical itinerary, which would be suitable for a person starting the trip from the same location at the same time. This option allows group members to travel together. Section 512 allows group members to book separate, identical air and hotel reservations, but has them share a single car rental; section 513 allows members to meet at the airport upon arrival (in this example, at the Boston airport) so a group member flying in from, for example, New York, could meet with members flying in from San Francisco, to share the car into Walton; and section 514 allows for only booking rooms at the same hotel, so group members may come and go separately but stay at the same hotel, allowing them to meet and travel together to the company site conveniently.

The system illustrated in FIG. 5 is just one embodiment of the novel art of this disclosure for automated coordination of services procurement for a group of individuals involved in a common goal or event. In this and other embodiments, one of the individuals (the leader) would define the attributes of the event and specify the other individuals to be involved in the event (the "group"). All of the individuals would be automatically notified, via the Internet or other media, by the system that they are invited to participate in the goal or event, and all individuals would be able to accept or decline membership in the group event or goal, in some cases in accordance with company policies for such participation, expense rules, privacy rules etc. Likewise, all individuals who accept group membership would be able to procure a combination of services required to execute the event. All individuals who accepted the invitation to join the group would be notified of the booking of services by the other members of the group, and each individual in the group would be able to make a services procurement request for the services procured by any other individual or individual (s) in the group. The system is able to coordinate sharing of the services based on its understanding of the mutual requirements of the group, and is also able to adjust the services procured by members of the group to better meet the overall group's objectives. The system is likewise able to adjust the services procured by the members to optimize the use of the services by the group as a whole, or to intelligently cancel services based on changes in requirements input by one or more members of the group. In some cases, corporate policy may allow some participants to exceed their usual settings in context of a group event. In other cases, it may notify additionally their supervisor, procurement group, or human resources, and in yet other cases, it may require a confirmation by e-mail from a supervisor or similar. The type of services that may be procured are not limited to services related to travel, but rather may also include other services related to attending an event, or other activities to participate in while visiting a location.

Yet in some cases, if a member needs to come in late, for example due to a previous meeting, he may not share in some aspects, such as the share car ride for example etc. In other circumstances, if a member needs special facilities, not available at the hotel/car/flight chosen for the group, the member may break out of the group arrangements. This may be on a case by case basis, with approval and or notification of the group leader, his supervisor etc., or may be pre-defined in the member's profile in some cases.

Figure 6:
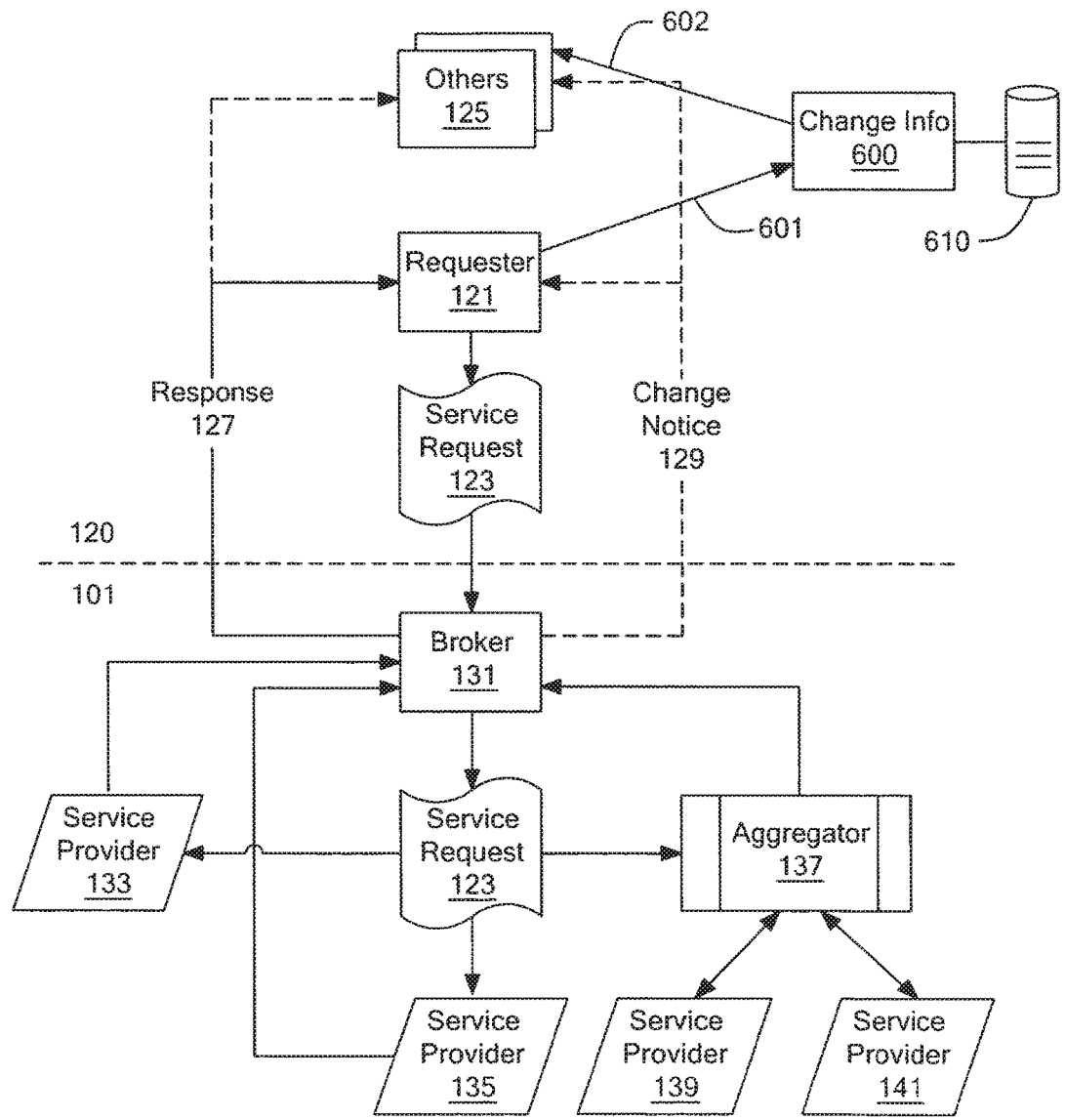
FIG. 6 illustrates block diagram of an alternative embodiment.

FIG. 6 illustrates a block diagram of an integration of the embodiment for providing coordination of group procurement of services integrated in the system of FIG. 1B, as discussed above. The integration includes the addition of a group information block 600 that allows the original requester 121 to export his travel plans via function 601 into block 600. The requester can assign group members into a group data base 610, so that when the designated group members log in as other users 125, they can see what travel options are available, pull them down via function 602, and then participate in making travel plans, as described above in relation to FIG. 5. Furthermore, as mentioned above, group member may receive a particular invitation, and in some cases, that may require a supervisor's approval.

In yet other cases, a user may be able to forward their service request in an automatic fashion. For example, a user could initiate a group by inviting others to join for a meeting at a specific date, time, and location. Once they have done this, they have formed a group. Once one member of the group has booked their travel for this particular meeting, they would be prompted to see if they are willing to share their itinerary with the other members of the group. If they give permission for the other members to see the itinerary, all other members of the group would be automatically notified by the system. When notified, the other members of the group would be given options to book similar or identical services. When other group members select an option, a service request such as (123) in FIG. 6 is automatically generated and sent to the services exchange.

Figure 7A:
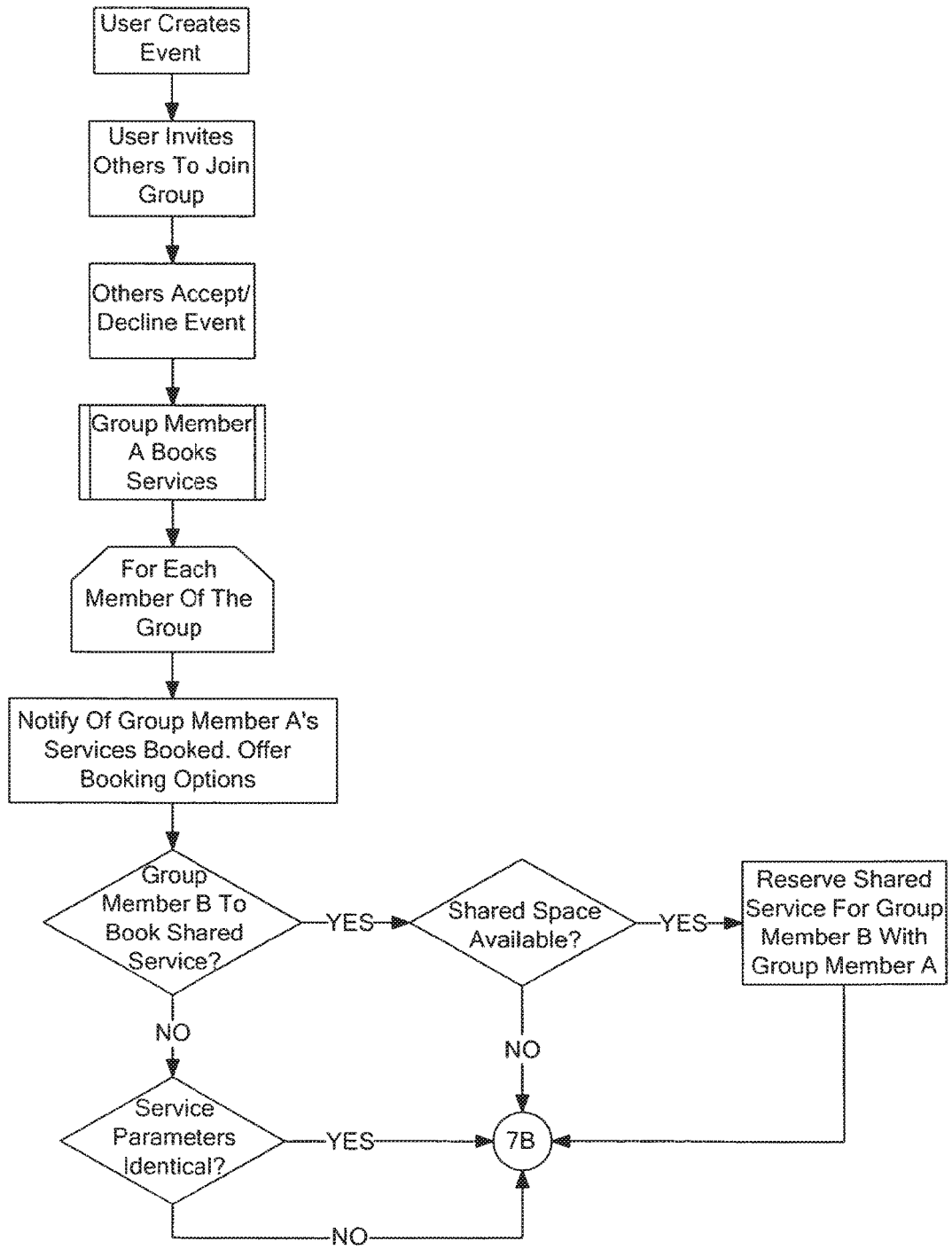
FIGS. 7A-7B illustrate a more detailed block diagram of one embodiment.
Figure 7B:
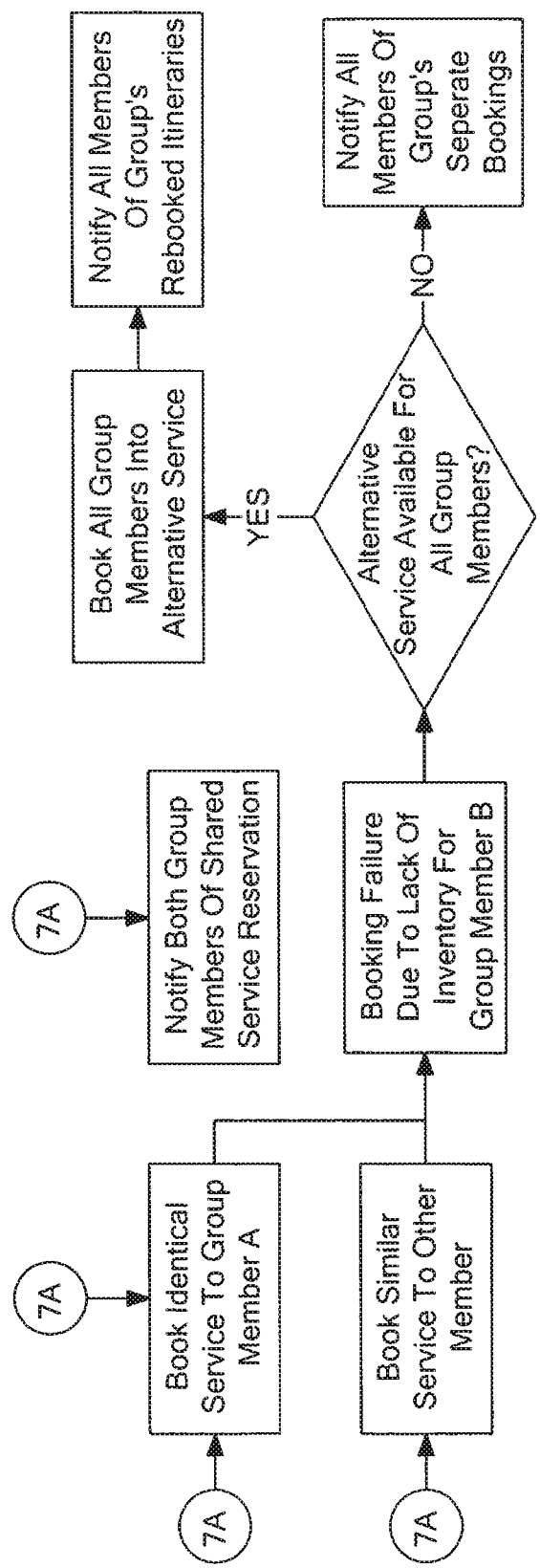

FIGS. 7A-7B provide a further, more detailed sample flowchart of how a group travel could be established, in accordance with one embodiment. In process 701 the user creates an event. Then in process 702, he can invite others to join the group, either by entering their names, e-mail addresses or other user identification. They may also in some cases be entered from address books, organizers etc. In process 703, invitees of the group may accept or decline participation in the event, on a one by one basis, or as a group. In process 705, Group Member A books his services. Process 705 symbolizes the same for the other members of the group. In process 706, Group Member A services are booked, offering booking options, such as time of day of flight, available airlines, hotels etc.

In process 710, Group Member B decides (or may be forced) whether to book shared service, or not. In the case of shared service, process 711 checks for availability of shared space, i.e. number of guests in a hotel room, available seats on same flight, available space in Limo etc. In case of availability, in process 712, Group Member B's shared service is reserved. In process 713, both members (or as many as are in the group) are notified of a successful shared trip. In the case of no availability, an identical booking is pursued in process 721, but not a shared one.

In the case of non-shared services of process 710, process 720 determines whether identical services are required. If yes, an identical booking is pursued in process 721. If not identical, similar or as specified services are booked in process 722.

Following both processes 721 and 722, process 723 deals with the booking failure of Group Member B, due to lack of inventory matching the requirements. In process 730, a recovery is attempted by checking for alternative services for all group members. If they are not available, process 731 notifies all group members of separate bookings. If an alternative service is available for all group members, in process 730 all members are booked into those alternative services in process 732. Then the group members are notified of the success in process 733.

Improving Customer Satisfaction in Booking Process

In many software applications, much of the complexity of the business logic and connections between systems is hidden from the end user. This transparency causes problems for the end user because he has no way to interact with the process and help resolve the issues. There may be any number of unknown causes of failures during the transaction process. The system often does not know how to handle many specific error conditions resulting from the interaction with a third-party system, whether that third party system is a global distribution system or a supplier inventory system.

Figure 8:
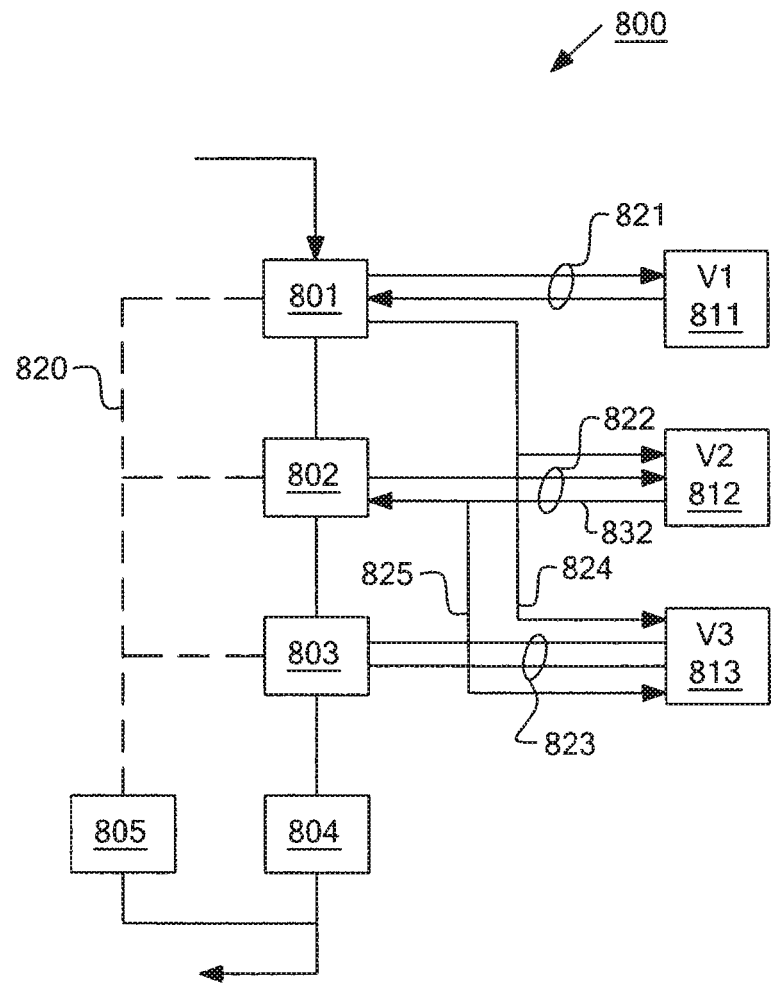
FIG. 8 presents a flow diagram of a conventional example of a consolidated services system.

FIG. 8 presents a flow diagram of a conventional example of a consolidated services system 800. In this case, a user is attempting to transact, through Web-based interfaces, a multi-vendor booking, such as, for example, booking of a travel package (airline, hotel, car), where V1 could be the airline, V2 could be the hotel, and V3 could be the car rental agency. At process step 801, the user is prompted for data for the first vendor V1 811. When the user enters data for vendor 1, the data is exchanged with vendor 1 via connection 821. Some of this data is then pushed to process step 802 via connection 824 for use in the next transaction. Process step 802 prompts the user for data for vendor 2 812, and data is exchanged with vendor 2 via connection 822. Some of those results are also used via connection 825 for the last vendor, vendor 3 813. Again, process step 803 prompts the user for data for vendor 3 813, and data is exchanged with vendor 3 813 via connection 823. Once all the transactions have been closed, process step 804 displays confirmation of the transactions and the payment method.

If a fault occurs, for example, that vendor 2 due to a problem 832 cannot respond to the information input via connection 822, then typically the user would be prompted to default through path 826 to process step 805. Process step 805 may ask the user to visit the Web site again, or may, offer to save the information input thus far to the Web site and continue at a later time. This is the typical situation, but it is the user's duty to go back and continue pursuing it.

What is clearly needed is a system and method to intelligently determine the cause of the issue in procuring the service is and, based on a set of rules, offer the user a path to complete the procurement successfully.

What is further needed is a system and method intelligent enough to know when a supplier is not available and queue requests until the supplier system is available again.

Further, such a system 800 may sometimes not have each end user account fully configured with all of the information needed to successfully confirm reservations in process step 804. For instance, the end user account may be missing a username or password required to access a supplier system. What is further clearly needed is a system that actively manages the status of each account so that the user's transactions do not fail because of misconfigured or expired account configuration status.

Typically, when services are being procured, a number of issues may arise, including limited availability, changing prices from initial quotes, and possibly errors caused by the inventory system of the supplier. Also, suppliers are not always available to respond to requests in real time.

Figure 9:
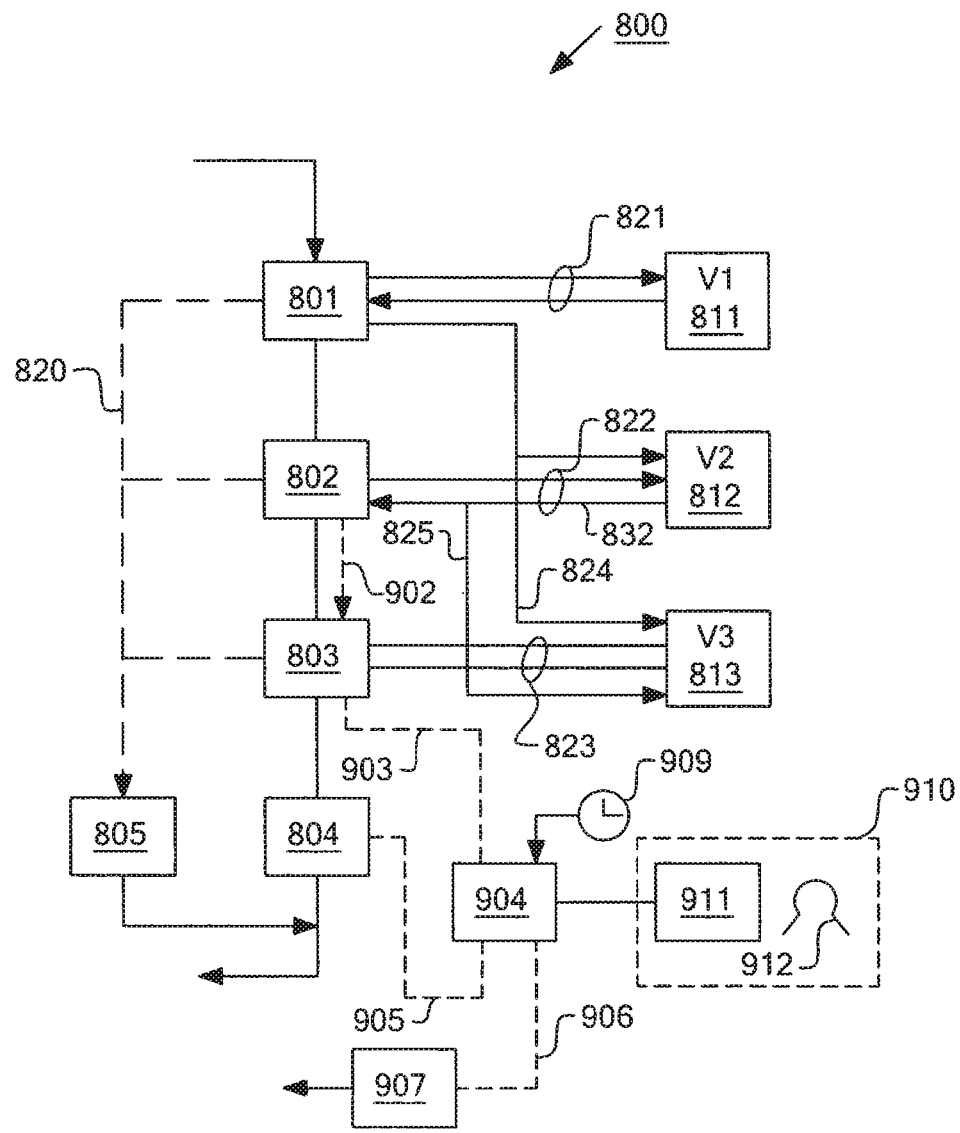
FIG. 9 presents a flow diagram of an exemplary system and a method according in accordance with one embodiment.

FIG. 9 presents a flow diagram of an exemplary system and a method according in accordance with one embodiment. The problem 832 would result in a special communication 901 back to process step 802. Communication 901 would allow the process flow to continue through a special connection 902 and finish transaction process steps 802 and 803. But rather than giving the user a final confirmation at process step 804, the user is rerouted via connection 903 to a special finalization process step 904, where the user is offered an option, for example, to assume the transaction will be completed and be notified about the final receipt at a later time. In this option, in some cases, the system will continue to attempt to complete process step 802 with the information already input by the user and notify the user when the process is completed successfully. Step 904 may tell the user the number of hours to wait before the problem 832 is corrected. Alternatively, the user may be prompted at a later time; for example, with a message that has an embedded link, to continue or finalize his transaction in process step 804.

Depending on the type of problem, the transaction may also be escalated at process step 904 to a contact center 910, where a live agent 912 using screen 911 may, for example, have access to the internal database of vendor 2, or may even call or email (or otherwise notify) vendor 2 to complete the transaction and then manually enter the missing data into the transaction process steps 801 through 804 through interaction in process step 904, thus allowing the transaction to be completed via path 905 and be completely transparent to the user, except for a small additional delay.

In yet other cases, for example, when the problem lies not so much in a fault as in a process rule regarding booking times, then a time component 909 may keep the case active in process step 904 until the booking time arrives. For example, many airlines restrict flight bookings to a certain time window. Rather than keeping the user waiting, or asking the user to check again, or telling him that the flight cannot be booked, which is the typical standard operation, time component 909 may "keep the request in mind" and try to book it as soon as the booking window at the vendor opens. Other examples of limited-time booking windows are overnight shipping, which typically can only be booked less than 24 hours ahead of the shipping time; or certain event registrations that may have a specific narrow booking window, where, for example, online booking may be only opened one month ahead of the date of an event and closed a week ahead. By proceeding through the process according to the novel art of this disclosure, the user may "prebook" and be in a virtual waiting queue outside the box office window.

When the booking steps are complete, the system, as part of the confirmation process step 904, requires information about payment for the bookings. Using an intelligent user profile, the system could store information about the employee's accounts with each supplier. If the user does not have a supplier account properly set up, the system could, for example, ask the user to create one or enter his credentials before submitting a reservation request with that supplier. The system would then present to a user a list of steps required to successfully configure and validate his account before using the system.

Platform for Multi-Service Procurement

Figure 10:
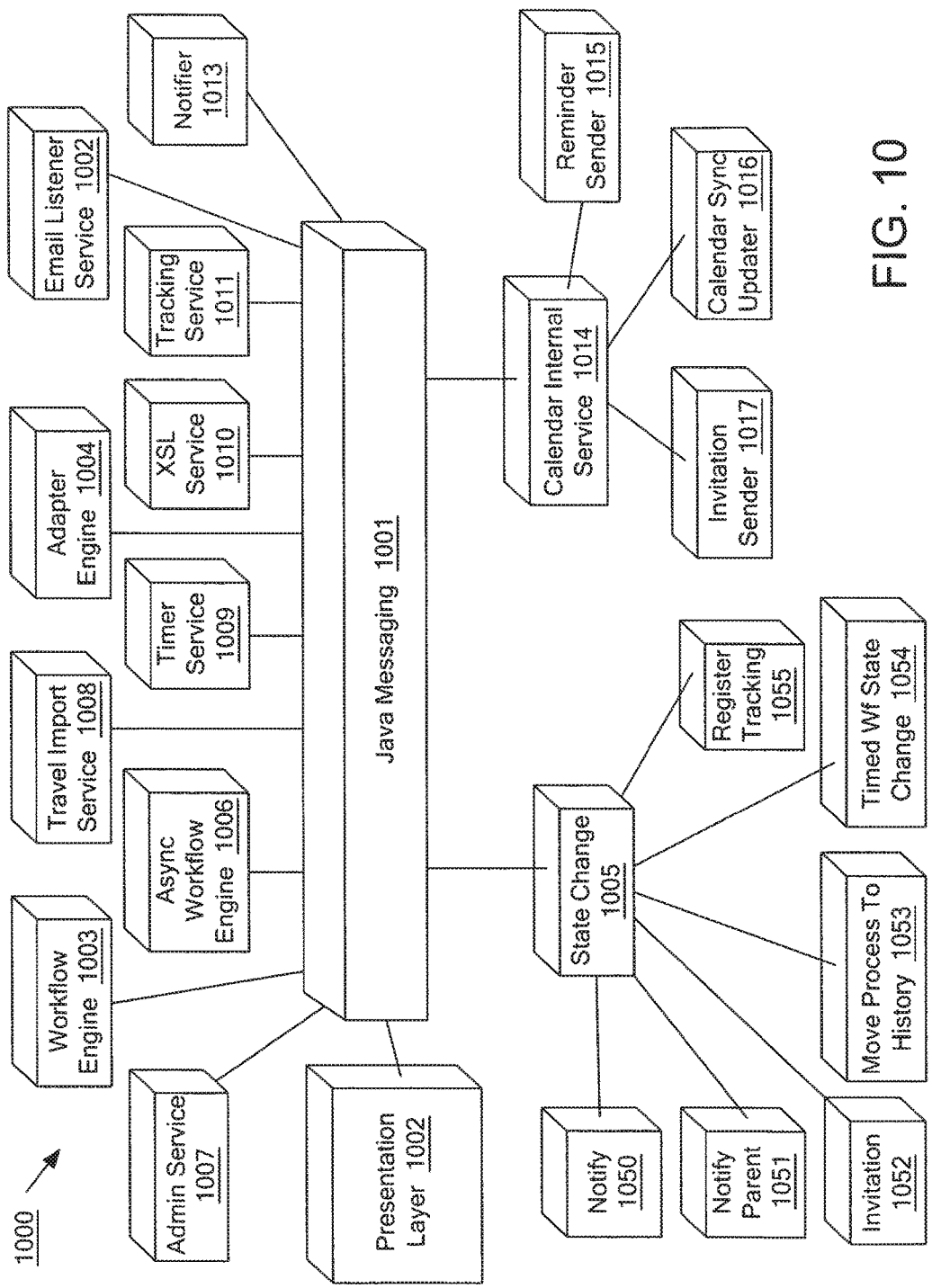
FIG. 10 shows an overview of the internal services within a software platform that enables procurement of services across categories and coordination and orchestration of multi-procurements as part of a single transaction.

FIG. 10 shows a simplified overview of the internal services 1000 within a software platform that enables procurement of services across categories and coordination and orchestration of multi-procurements as part of a single transaction.

Primary services shown in FIG. 10 are the Java messaging system 1001, which is at the core of the asynchronous internal services architecture; the presentation layer 1002, which creates the visual presentation; the state change services 1005, for taking actions related to state changes for a procurement service; including a notify service 1050; a notify parent service 1051, for multi process coordination; an invitation service 1052; a move-process-to-history service 1053 (to archive closed processes); a timed workflow (Wf) state change service 1054; and register tracking service 1055 for registration of new processes, etc.

Other important modules include administration service 1007; workflow engine 103, which is a very important core element to ensure that the workflow is maintained properly; the asynchronous workflow engine 1006, which manages the asynchronous aspects of the workflow; the travel services import 1008, which allows the importation of available travel services; the timer service 1009, for providing call back alarms at a specified time; and adapter engine 1004, which is used for the adaptation to various types of interfaces. Also important is XSL service 1010, for interfacing with exchangeable service language; tracking service 1011, for the external tracking of events; email listener service 1012, for asynchronous email communication; and notifier 1013, which can send notifications to the various communication channels. Last but not least is the calendar integration service 1014. It contains the invitation sender 1017, which coordinates the invitation process for a particular procurement process; the calendar sync updater 1016, which allows events to be updated into popular personal calendars, such as Outlook, Lotus Notes, Yahoo Mail, etc.; and the reminder sender 1015, which can send out reminders and can also use calendar or email reminders to remind users of pending events.

Figure 11:
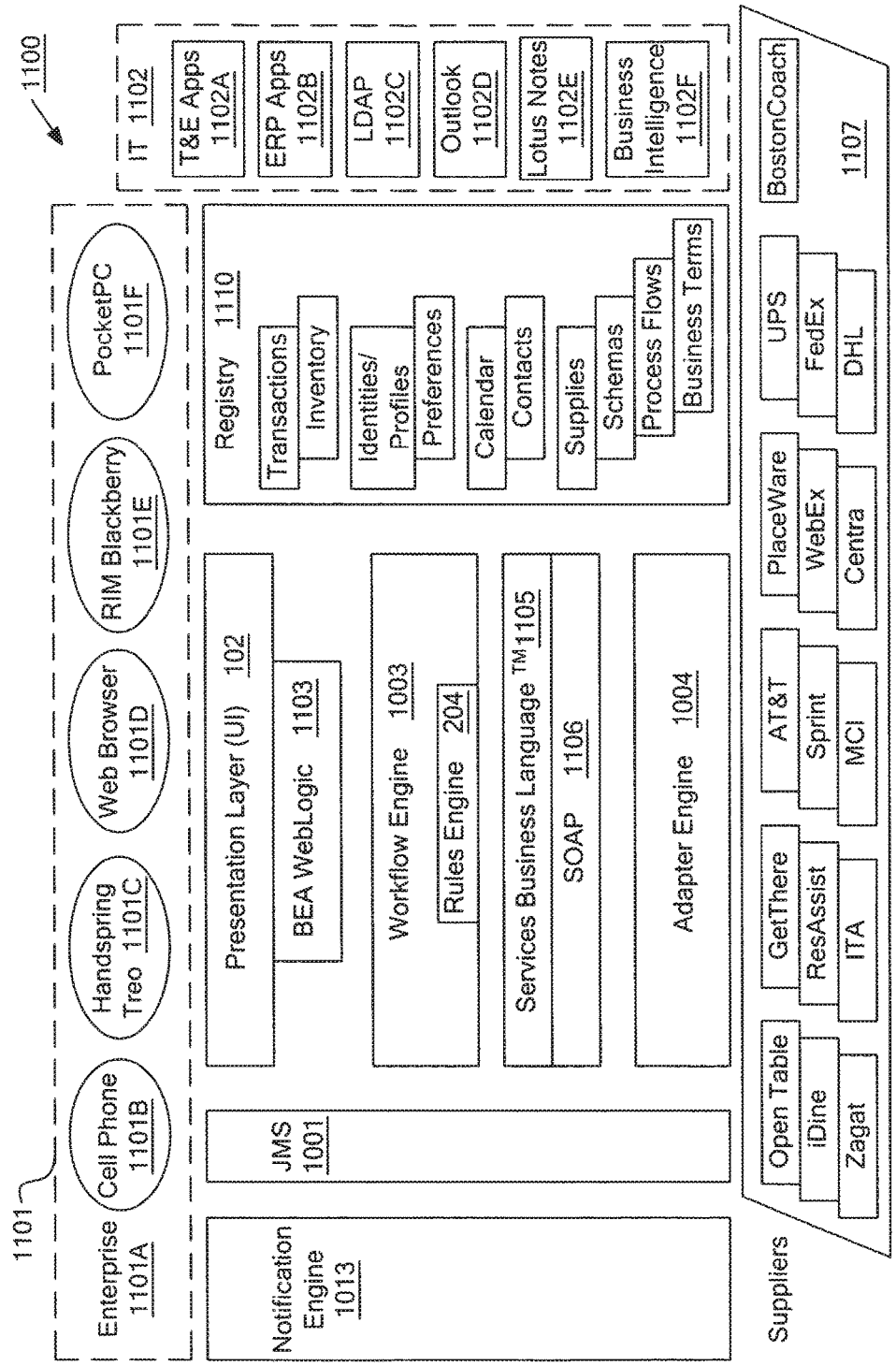
FIG. 11 shows a functional view of the SOA platform.

FIG. 11 shows a functional view of the SOA platform. The platform may be broken down into several major components (each of which may be composed of one or more IS).

Presentation layer 1002 manages communication with the end user, allowing users to describe the service they wish to procure, purchase instances of the service when presented with service options, modify or cancel the service, and check on the status of the procurement. The primary web browser-based client 1101 is constructed with Java Server Pages, using Struts and an extensive library of custom tags. The "small device browser-based client" is a JSP-based application that generates an XML "simplification" of the user interface. This XML is then rendered to various small-device browsers, including devices such as Pocket Internet Explorer for the PocketPC 1101*f* and Blazer for Palm and HandSpring Treo 1101*c*) taking into account their individual resolutions and HTML tag support.

The Workflow/Orchestration Engine 1003 takes care of three dimensions of complexity in a generic reusable manner.

The first dimension of complexity is across users—two users within a company can have a totally different look and feel of the application, different accounts, different providers and spend limits associated with them. The workflow layer is intelligent and takes this into account. The tasks of coordinating meetings through invitations to different users, notifications, calendar integration, etc are also fairly complex.

The second dimension of complexity is across verticals. Different service verticals have different business logic associated with them. For example, the conference call vertical has different business logic from package shipping.

The third dimension of complexity is across providers in a vertical. Each provider typically has its own definition of a service, may use different protocols and may have different exchange of messages to complete a transaction. The management and association of the appropriate billing and connection account for a procurement with a supplier is also complex.

The workflow system manages these complexities. The core of the system consists of a number of internal services, each of which performs a simple task. The interaction between these services provides a generic infrastructure that is used across all users, services, and providers.

Policies governing user interaction and procurement of services are all governed by means of rules engine 1104. Rules can be easily entered through the Services Director to modulate the workflow processes.

The core of the workflow system consists of a number of generic process flows. An aggregation flow retrieves information in parallel from a number of providers 1107 and displays a consolidated set to a user. A specified provider flow communicates with the selected provider. And the best commodity flow procures a services from a prioritized list, obtaining the best available one.

The process flows follow the template design pattern and are modulated with the help of rules defined in the system. The flows are very general and reusable across different verticals. Complexity associated with service specific details is abstracted out. Provider specific choreography and message exchanges are handled by another internal service, the adapter engine 104. There is a well-defined interface-message exchange between the workflow and the adapter engine that leads to the development of reusable process flows across verticals and providers.

The core of the system is built to handle multi-procurement coordination. An example of this is the recurrence feature—one can define a conference call to be held say every Monday for the next 3 months. Each meeting is a child of the parent procurement process. The procurement processes are built to support this and follow the composite design pattern that enables one to coordinate procurement processes across a n-deep tree of related processes. Coordination of processes can occur across service verticals.

The adapter engine 1004 provides an abstraction to the workflow the exact exchange and translation of messages between the workflow system and the external service provider. This abstraction and break-up of responsibilities enables suppliers to be added rapidly into the platform without having to change the core of the system. The adapter engine controls the number of simultaneous connections being made to a supplier at any given instance of time, the appropriate transport and authentication to be used, and the choreography needed to complete the transaction with a supplier/web service.

Once a service has been procured, the user needs to be notified of that, as well as any changes to the status of the procurement. Based on the defined process flow, the orchestration layer places notification messages onto the JMS bus for handling by the notification engine 1013. The notification engine then contacts users via the methods selected by the user for that particular service vertical, including voice, SMS, and email.

Once a service has been procured, the Calendar Integration Service 114 is responsible for integrating the event information in the user's calendar. The Calendar Integration Service handles the complexity of locating the user's appropriate groupware server 1102x—e.g., Microsoft Exchange (or Outlook) 1102d or IBM Lotus Notes 1102e—and populating the user's calendar with the appropriate information.

The commerce registry 1110 consists of the database store, internally used Java-based object model APIs and externally used XML-based APIs, for all of the abstractions necessary in a web-services oriented application for commerce. These abstractions include a listing of all of the users of our e-procurement application and attributes of those users and the suppliers. Resources are added via IT manager 1102 and explicit modules, such as 1102b for back end services from ERP, 1102c for Lightweight Directory Access Protocol (LDAP) and 1102a for travel and entertainment (T&E) applications.

Figure 12:
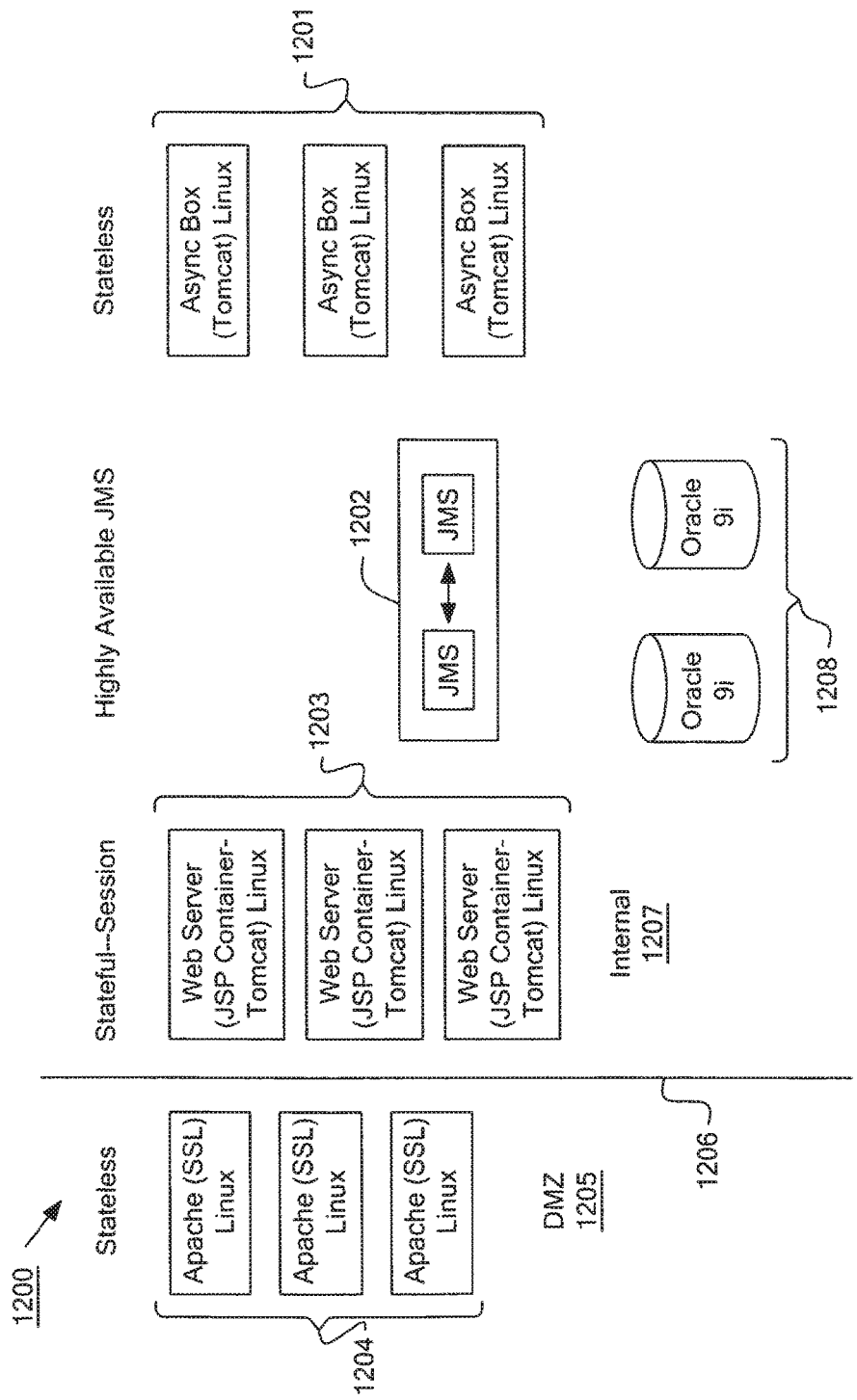
FIG. 12 shows an overview of the internal side of the WSNA system architecture.

FIG. 12 shows an overview 1200 of the internal side of the WSNA system architecture. The system is built using J2EE best practices for building highly scalable and high performing systems.

The system consists of a number of different tiers—the Apache web server tier 1204, the Tomcat UI tier 1201, the JMS tier 1202, the Asynchronous Internal Services tier 1207, and the database tier 1208. Linux is the operating system for all the tiers except the database, which may run on one of many popular operating systems, such as, for example, Solaris or Linux.

First, within the DMZ 1205 is a farm of Apache web servers. Each web server is stateless and is responsible for carrying out SSL and forwarding requests to appropriate Tomcat boxes. This tier can be scaled linearly by adding additional boxes.

Within the application network, a farm of Tomcat servers service HTTP requests. HTTP sessions are used for session management and a pinned-server approach is used. HTTP sessions are not clustered and this tier can also scale linearly by adding more boxes. If a server goes down, sessions on that server will be lost, which means that the user will have to log in once more. The UI internal service is the only internal service that is running on these servers—enabling all available resources to service user requests.

The Asynchronous Internal Services Tier 1207 behind internal firewall 1206 contains all the internal services required by the system other than the UI service. These are stateless servers and this tier can be scaled linearly as well.

Within the platform a common entity across categories—a procurement process—is created. These procurement processes are reusable across categories and have common services, such as notifications 1050 and 1051, calendar integration 1016, reminders 1015, etc., associated with them.

A typical procurement consists of the following data flow: First, an HTTP request is received by the Apache webserver. SSL is initiated. The request is forwarded to the appropriate UI Tomcat machine.

Request is serviced by the UI Tomcat tier. For rendering the JSP it may access the database. If the user is submitting a procurement request, then a transactional JMS message and a database write is done and the user request is serviced.

Asynchronously, the submitted JMS message will be delivered to one of the machines in the Asynchronous Internal Service Tier. This will initiate the workflow associated with servicing the request. This may involve multiple message exchanges within various services, interacting with different providers externally, and communicating back to the user via notifications and calendar update.

Figure 13:
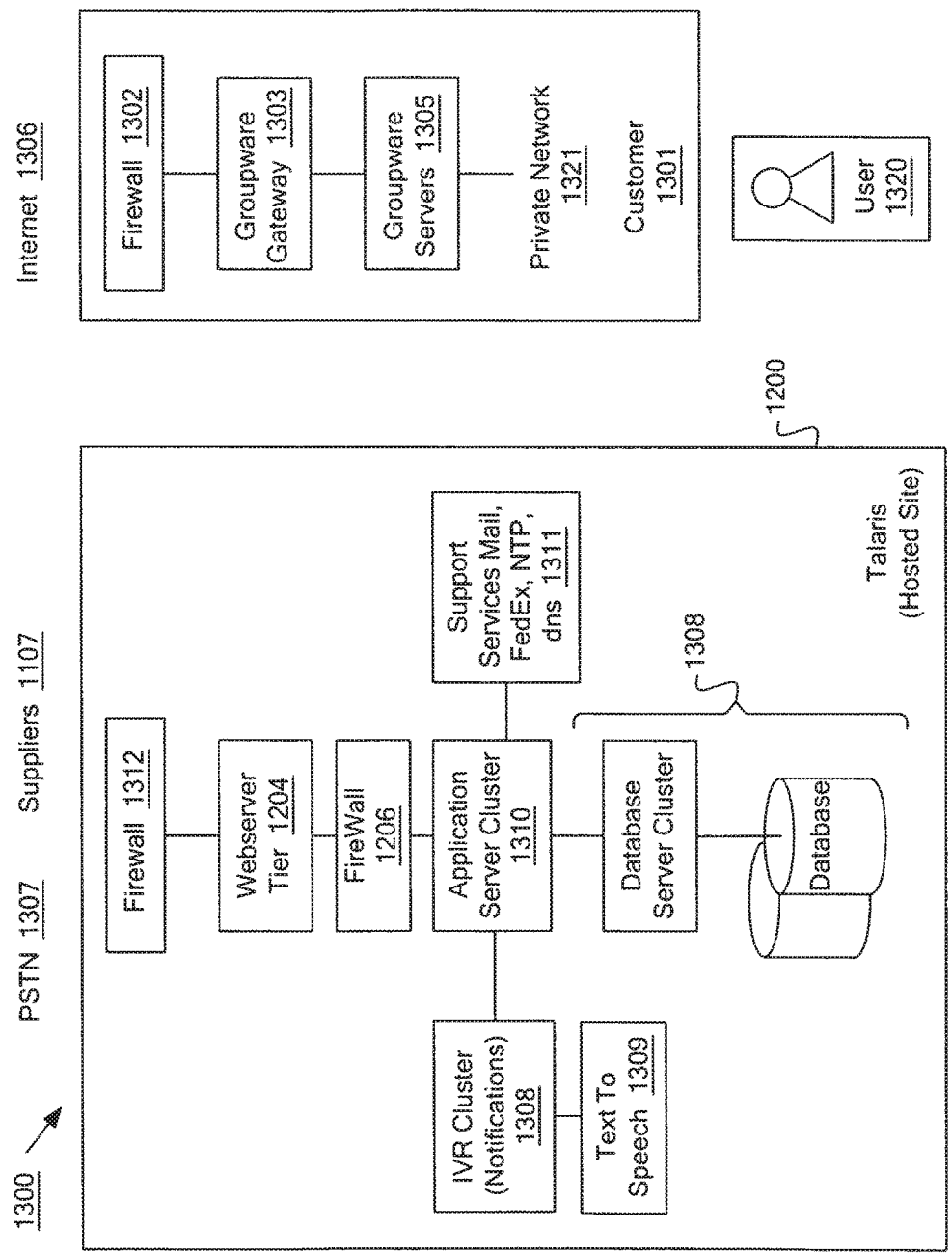
FIG. 13 shows an overview of the system of one embodiment, including the WSNA system architecture.

FIG. 13 shows an overview of the complete system 1300 of one embodiment, including the WSNA system architecture 1200, shown in this example embodiment as a Talaris Hosted Site. It also shows a typical customer site implementation 1301, which has a firewall 1302, a groupware gateway 1303, and groupware servers 1305 to operate groupware services. User 1320 can then use private network 1321 for communication and access to system services. The user's requests are sent via the public Internet 1306, through the external firewall 1312 to the webserver tier 1304 and then through the secondary secure firewall 1206 into the system 1310. Also in some cases, requests may be received over the telephone through the PSTN 1307, and, through the use of standard IVR clusters, requests may be received or notifications may be sent. In this example embodiment, the primary application of telephone communication is for voice notification, using text-to-speech conversion module 1309. Thus, for example, the system may dial a user while he is traveling to give him reminders and other notifications. Also, requests to suppliers 1107 may be sent either through direct notification or via the Internet 1306 from the support services module 1311, traveling via the application server cluster 1310, internal firewall 1206, web server 1304, and external firewall 1312 to the outside world.

By operating the majority of the services and service adaptations at the Talaris site, updates to supplier software, interface functions, etc., do not affect the servers and the software installed at the client site 1301, because all the changes may be done transparently at the Talaris site 1200.

The framework, consisting of the IS system in combination with the WSNA system, uses asynchronous, flow event type systems, Each procurement process can result in one or more generic orchestration flow events, such as aggregation flows that talk to multiple providers in parallel and aggregate information—or, in other cases specified provider flows that talk to a single specified provider, etc. New categories can be added to the platform by reusing the generic orchestration flow templates and adapting them to the specific provider/service as required. The workflow/procurement process for each user is modulated by using business rules that enable the flows to select various elements of the process, including but not limited to providers, billing and connection accounts, spend limits, messaging, etc.

Further, the procurement processes may be arranged in a parent-child (composite) pattern to create trees of procurements. Generic flows exist that enable a parent to coordinate the activities of the child processes. A parent process may itself have a parent process coordinating its efforts. Multi-process orchestration may be implemented by creating this treelike structure. The depth of the tree may be as may layers as required. Work is orchestrated by means of messages passed between the parent and the children at each level.

This approach can be used for orchestrating multi-procurement processes in a single category, as is the case with recurrence, or across categories. This tree of procurement processes can be used to handle transactionality across multi-procurements, for example, a change in a child process causing the transaction to roll back would be carried out by the child process communicating to its parent. The parent would then roll back procurements that its other children had processed and then communicate back to its own parent. That would then roll back any transactions of its parents.

An additional element of the novel art of this disclosure is complex platform for integrating services as described above. Such a platform has a large number of configurable parameters. A framework has been developed to enable ease of use and management of these configurable parameters.

Following are the steps in developing the framework. First, a toolkit is developed that consists of XML schemas, XSLT transformers, SQL stored procedures, and java code. The purpose of the toolkit (services) is to enter the values and parameters used in the flow and transform those values and parameters into a format that can be entered in the database. The data is grouped to be retrieved on a group basis for the relevant flows.

Next a generic database schema to represent the data in the database is developed, and then code is auto-generated code from the entered data to automatically generate java code that is a container for data, one per group. There can be nested groups.

Following these steps, a set of generic visitor classes, which can manipulate the generated code to persist and retrieve the data, is developed, based on defaulting logic.

Finally, a set of tools is developed to validate the entered data, the generated data, and the data in the database, and to cross-check data based on predetermined data validation rules.

The service-oriented architecture of the novel art of this disclosure is based on these principles:

Reusability: Modular components can be reused across verticals. Therefore, adding a new service to the platform is fairly simple as most of the work is already done by these horizontal services and infrastructure.

Maintainability and extensibility: Each component can be tested in a stand-alone manner. The logic to be implemented for a service to do its work is generally simple as compared to an implementation where the application is not broken into modular sub-components. The code is a lot more maintainable and extensible. Each internal service extends a base class that takes care of all the complexities associated with interacting with JMS and multi-threading. This makes the task of writing an internal service is simple, as a developer just needs to implement the business logic.

Scalability: There can be as many instances of each of the internal services as required. They have been implemented in a fault-tolerant manner, whereby each can be shut down and restarted without affecting any other.

Low cost of scaling: All the internal services are simple java programs that do not need an application server. The platform runs on commodity Linux boxes, and there are minimal licensing costs, to add another instance.

Asynchronous mode of operation: The infrastructure enables a lot of the processing to happen asynchronously, due to which the end user does not have to wait till all the processing has been done.

The diversity of services available and its process-flow based infrastructure allows a different type of user experience than typical detailed interactive procurements where all service options, preference and user information are selected and entered manually. The knowledge of the user provided by the registry, plus the ability to asynchronously submit and fulfill service requests via XML documents and Web services, enables a new class of application. Users can quickly describe a simplified set of parameters of the service they are interested in, such as, for example, something as simple as describing that they want to make a trip to New York on a specific day, or plan a meeting for a specific time. Each of these events usually requires the purchase and coordination of several services.

The platform can then determine potential services that can fulfill the request, based on its knowledge of the user's many attributes and their preference, and can then asynchronously find candidate services and present options to users for selection or confirmation. Only the rich information in the registry about the user and available services, combined with the rules-based process flow, and an asynchronous Web services-based method of supplier integration, allows this simple yet sophisticated method of service procurement.

This is a platform where suppliers can easily register the service offerings and the web service interfaces that they support to facilitate purchase of those services. In addition to allowing suppliers to describe their own web service interfaces, the platform also provides the Services Business Language (SBL), a standard set of XML document interfaces, derived from UBL, for the procurement of services. There are "vertical libraries" for SBL for specific verticals, in areas such as web conferencing, package shipping, audio conferencing, etc. If the supplier offers services not yet covered by SBL, the platform provides a set of generic documents for all verticals that they can modify for the needs of their specific service type.

With the inclusion of asynchronous document-oriented web service integration, suppliers have a high-performance and scalable method of electronically integrating their business with the outside world. In addition, the asynchronous document delivery capability enables more sophisticated business models of responding to service requests that map closer to how these processes are traditionally performed. This includes the capability of alternate provisioning, as well as more flexible pricing and management of perishable inventory.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

It is clear that many modifications and variations of this embodiment may be made by one skilled in the art without departing from the spirit of the novel art of this disclosure.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer system comprising:
   at least one database;
   a database server cluster configured to operate the at least one database;
   an application server cluster; and
   at least one web server;
   wherein software executing on the computer system, including the application server cluster and the at least one web server, is configured to provide Internal Services (IS) and external Web Services in multiple procurements as part of a single transaction, wherein the IS is configured to manage the multiple procurements as a procurement tree having a child process and a parent process, related to the child process, and coordinate activities of the child process by passing messages between the parent process and the child process, the messages allowing for the child process to rollback the parent process;
   wherein the software has an architecture including
   a presentation layer configured to present users interfaces, to users with procurement roles within an organization having different procurement profiles, with different look and feel of an application for the users, the user interfaces configured to allow users to describe services the end user wants to procure, purchase instances of the services when presented with service options, modify or cancel the services, and check on status of procurement;
   a workflow engine configured to manage a plurality of workflows generic to a plurality of service verticals having different business logic, where each of the service verticals has different service providers having different service definitions and different message exchanges to complete a transaction, the workflow engine further configured to generate a procurement tree in response to a service described by the user via the presentation layer, child nodes of the procurement tree representing processes to be executed by respective service providers;
   an adapter engine configured to bridge the generic workflows and the different service definitions and different message exchanges;
   an asynchronous workflow engine to execute the processes represented by the child nodes of the procurement tree asynchronously and deliver results of the processes asynchronously to the user; and
   a messaging system configured to interconnect the presentation layer, the workflow engine, the adapter engine, and the asynchronous workflow engine and facilitate the passing of the messages between the parent process and the child process.

2. The system of claim 1 wherein the IS includes a java messaging system.

3. The system of claim 1 wherein the IS includes a presentation layer to create a visual presentation.

4. The system of claim 1 wherein the IS includes a state change services to take actions related to state changes for a procurement service.

5. The system of claim 1 wherein the IS includes one of a notify service and a notify a parent service for multiple process coordination.

6. The system of claim 1 wherein the IS includes an invitation service.

7. The system of claim 1 wherein the IS includes one or more of multi process coordination, an invitation service, a move-process-to-history service, a timed workflow state change service, and a registered tracking service to register new processes.

8. The system of claim 1 further comprising a calendar integration service including one or more of an invitation sender to coordinate an invitation process for a particular procurement process, a calendar think updater to allow events to be updated into personal calendars, and a reminder sender to send out reminders.

9. The system of claim 1 wherein the IS include one or more of an administration service, a workflow engine, a travel services import to allow the importation of available travel services, a timer service to provide callback alarms at a specified time, and an adapter engine to adapt to various types of interfaces.

10. The system of claim 1 wherein the IS further includes one or more of XSL services to interface with exchangeable service languages, a tracking service for the external tracking of events, an email listener service for asynchronous email communications, and a notifier to send notifications to one or more communication channels.

11. The system of claim 1 further comprising a web browser-based client.

12. The system of claim 1 wherein the system further includes a workflow engine to process multiple dimensions in a generic reusable manner, including at least one of complexity across users, complexity across verticals, and complexity across providers in a vertical.

13. The system of claim 12 wherein the workflow engine includes a rule engine to govern user interaction in procurement of services.

14. A tangible, non-transitory machine readable medium having stored thereon a set of instructions which when executed, perform a method comprising:
   providing a service oriented transaction processing system, including
   at least one database;
   a database server cluster configured to operate the at least one database;
   an application server cluster; and
   at least one web server;
   wherein software executing on the computer system, including the application server cluster and the at least one web server is configured to provide Internal Services (IS) and external Web Services in multiple procurements as part of the single transaction, wherein the IS is configured to manage the multiple procurements as a procurement tree including a child process and a parent process, related to the child process, and coordinate activities of the child process by passing messages between the parent process and the child process, the messages allowing for the child process to rollback the parent process;
   wherein the software has an architecture including
   a presentation layer configured to present users interfaces, to users with procurement roles within an organization having different procurement profiles, with different look and feel of an application for the users, the user interfaces configured to allow users to describe services the end user wants to procure, purchase instances of the services when presented with service options, modify or cancel the services, and check on status of procurement;
a workflow engine configured to manage a plurality of workflows generic to a plurality of service verticals having different business logic, where each of the service verticals has different service providers having different service definitions and different message exchanges to complete a transaction, the workflow engine further configured to generate a procurement tree in response to a service described by the user via the presentation layer, child nodes of the procurement tree representing processes to be executed be respective service providers;
an adapter engine configured to bridge the generic workflows and the different service definitions and different message exchanges; and
an asynchronous workflow engine to execute the processes represented by the child nodes of the procurement tree asynchronously and deliver results of the processes asynchronously to the user; and
a messaging system configured to interconnect the presentation layer, the workflow engine, the adapter engine, and the asynchronous workflow engine and facilitate the passing of the messages between the parent process and the child process.

15. A computer-implemented method comprising:
providing a service oriented transaction processing system, including
at least one database;
a database server cluster configured to operate the at least one database;
an application server cluster; and
at least one web server;
wherein the software has an architecture including
a presentation layer configured to present users interfaces, to users with procurement roles within an organization having different procurement profiles, with different look and feel of an application for the users, the user interfaces configured to allow users to describe services the end user wants to procure, purchase instances of the services when presented with service options, modify or cancel the services, and check on status of procurement;
a workflow engine configured to manage a plurality of workflows generic to a plurality of service verticals having different business logic, where each of the service verticals has different service providers having different service definitions and different message exchanges to complete a transaction, the workflow engine further configured to generate a procurement tree in response to a service described by the user via the presentation layer, child nodes of the procurement tree representing processes to be executed by respective service providers;
an adapter engine configured to bridge the generic workflows and the different service definitions and different message exchanges; and
an asynchronous workflow engine to execute the processes represented by the child nodes of the procurement tree asynchronously and deliver results of the processes asynchronously to the user; and
a messaging system configured to interconnect the presentation layer, the workflow engine, the adapter engine, and the asynchronous workflow engine and facilitate the passing of the messages between the parent process and the child process.

* * * * *